United States Patent
Chun et al.

(10) Patent No.: US 8,953,505 B2
(45) Date of Patent: Feb. 10, 2015

(54) COMMUNICATION METHOD AND APPARATUS BETWEEN A TERMINAL AND A BASE STATION VIA A FRAME IN A COMMUNICATION SYSTEM INCLUDING A RELAY STATION

(75) Inventors: Jin Young Chun, Anyang-si (KR); Dong Guk Lim, Anyang-si (KR); Jin Sam Kwak, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 324 days.

(21) Appl. No.: 13/515,495

(22) PCT Filed: Dec. 17, 2010

(86) PCT No.: PCT/KR2010/009042
§ 371 (c)(1),
(2), (4) Date: Jun. 12, 2012

(87) PCT Pub. No.: WO2011/074906
PCT Pub. Date: Jun. 23, 2011

(65) Prior Publication Data
US 2012/0250592 A1    Oct. 4, 2012

Related U.S. Application Data

(60) Provisional application No. 61/287,709, filed on Dec. 18, 2009, provisional application No. 61/290,877, filed on Dec. 29, 2009, provisional application No. 61/291,318, filed on Dec. 30, 2009.

(30) Foreign Application Priority Data

Dec. 15, 2010 (KR) .................. 10-2010-0128178

(51) Int. Cl.
*H04W 72/04* (2009.01)
*H04J 3/00* (2006.01)
(Continued)

(52) U.S. Cl.
CPC ............ *H04L 5/0055* (2013.01); *H04L 5/1469* (2013.01); *H04L 5/0053* (2013.01); *H04L 1/1812* (2013.01); *H04L 1/1887* (2013.01); *H04L 5/0007* (2013.01)
USPC ........................................................ 370/280

(58) Field of Classification Search
None
See application file for complete search history.

(56) References Cited

U.S. PATENT DOCUMENTS 8,599,738 B2 * 12/2013 Lin ............................... 370/315
2007/0217367 A1 * 9/2007 Lee et al. ...................... 370/335
(Continued)

FOREIGN PATENT DOCUMENTS

| KR | 10-2007-0080367 | 8/2007 |
| KR | 10-2007-0090432 | 9/2007 |
| KR | 10-2009-0078726 | 7/2009 |

*Primary Examiner* — Steve Young
(74) *Attorney, Agent, or Firm* — Lee, Hong, Degerman, Kang & Waimey

(57) ABSTRACT

The present invention provides an embodiment of a method and system for applying a hybrid automatic repeat request (HARQ) scheme to a system employing a relay station. According to one embodiment of the present invention, a frame including an access zone and a relay zone can be configured based on the HARQ timing which can be calculated based on the structure of the access zone and relay zone. Also, according to one embodiment of the present invention, the structure of the access zone and relay zone can be determined by multiplexing communication systems that support two kinds of systems different from each other. According to one embodiment of the present invention, the HARQ scheme can be applied even to a frame including an access zone and a relay zone, by calculating the HARQ timing.

4 Claims, 28 Drawing Sheets

(51) Int. Cl.
*H04L 5/14* (2006.01)
*H04L 5/00* (2006.01)
*H04L 1/18* (2006.01)

(56) References Cited

U.S. PATENT DOCUMENTS

| | | | |
|---|---|---|---|
| 2008/0045144 A1* | 2/2008 | Fujita ............................... | 455/7 |
| 2009/0181689 A1* | 7/2009 | Lee et al. ...................... | 455/450 |
| 2010/0080139 A1* | 4/2010 | Palanki et al. ................. | 370/252 |
| 2010/0135272 A1* | 6/2010 | Dayal et al. ................... | 370/343 |
| 2010/0211845 A1* | 8/2010 | Lee et al. ...................... | 714/749 |
| 2010/0246456 A1* | 9/2010 | Suo et al. ...................... | 370/280 |
| 2011/0085478 A1* | 4/2011 | Zhongfeng et al. ........... | 370/280 |
| 2011/0134813 A1* | 6/2011 | Park et al. ..................... | 370/280 |

* cited by examiner

COMMUNICATION METHOD AND APPARATUS BETWEEN A TERMINAL AND A BASE STATION VIA A FRAME IN A COMMUNICATION SYSTEM INCLUDING A RELAY STATION

CROSS-REFERENCE TO RELATED APPLICATIONS

This application is the National Stage filing under 35 U.S.C. 371 of International Application No. PCT/KR2010/009042, filed Dec. 17, 2010, which claims the benefit of earlier filing date and right of priority to Korean Application No. 10-2010-0128178, filed on Dec. 15, 2010, and also claims the benefit of U.S. Provisional Application Ser. No. 61/287,709, filed on Dec. 18, 2009, U.S. Provisional Application Ser. No. 61/290,877, filed on Dec. 29, 2009, and U.S. Provisional Application Ser. No. 61/291,318, filed on Dec. 30, 2009, the contents of which are all incorporated by reference herein in their entirety.

TECHNICAL FIELD

The present invention relates to wireless communications, and more particularly, to a method and apparatus for determining hybrid automatic repeat request (HARQ) timing or configuring a frame by considering the HARQ timing in a wireless communication system.

BACKGROUND ART

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., $4^{th}$ generation (4G)) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference. In a system using the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner.

In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain. In order to support the various schemes described above, a control signal must be transmitted between a mobile station (MS) and a base station (BS). Examples of the control signal include a channel quality indicator (CQI) for reporting a channel state from the MS to the BS, an acknowledgement/not-acknowledgement (ACK/NACK) signal in response to data transmission, a bandwidth request signal for requesting allocation of a radio resource, precoding information in a multiple antenna system, antenna information, etc.

Hereinafter, a hybrid automatic repeat request (HARQ) scheme used in the conventional communication system will be described. The HARQ scheme is a combination of a forward error correction (FEC) scheme and an automatic repeat request (ARQ) scheme. According to the HARQ scheme, it is determined whether an unrecoverable error is included in data received by a physical layer, and retransmission is requested upon detecting the error, thereby improving performance.

A receiver using the HARQ scheme basically attempts error correction on received data, and determines whether the data will be retransmitted by using an error detection code. Various codes can be used as the error detection code. For example, when using a cyclic redundancy check (CRC), upon detection of an error of the received data in a CRC detection process, the receiver transmits a non-acknowledgement (NACK) signal to a transmitter. Upon receiving the NACK signal, the transmitter transmits relevant retransmission data according to an HARQ mode. The receiver receives the retransmission data and then performs decoding by combining the retransmission data with previous data. As a result, reception performance is improved.

The HARQ mode can be classified into a chase combining mode and an incremental redundancy (IR) mode. In the chase combining mode, to obtain a signal-to-noise ratio (SNR), error-detected data is combined with retransmitted data instead of discarding the error-detected data. In the IR mode, additional redundant information is incrementally transmitted with retransmitted data to reduce an overhead resulted from retransmission and to obtain a coding gain.

Meanwhile, a wireless communication system employing a relay station (RS) has recently been developed. The RS is employed for cell coverage extension and transmission capability improvement. A BS provides a service to an MS located in a coverage boundary of the BS via the RS, and thus can obtain an effect of extending the cell coverage. In addition, the RS improves signal transmission reliability between the BS and the MS, thereby improving transmission capacity. Even if the MS is located within the coverage of the BS, the RS may be used when the MS is located in a shadow area. The RS requires a radio resource region for downlink transmission with respect to a relay MS connected to the RS itself. In addition, after receiving a signal from the relay MS, the RS decodes the signal and then retransmits the signal to the BS. Thus, the RS requires a radio resource region for uplink transmission.

SUMMARY OF INVENTION

Technical Problem

The present invention provides a method and apparatus for applying a hybrid automatic repeat request (HARQ) scheme in a communication system employing a relay station.

Technical Solution

According to one aspect of the present invention, a method for communicating with a mobile station and a base station by using a frame in a wireless communication system employing a relay station is provided. The method includes: configuring a time division duplexing (TDD) frame including a plurality of downlink subframes and a plurality of uplink subframes; communicating with at least one of the mobile station and the base station by using the TDD frame, wherein a first number of subframes among the downlink subframes and a second number of subframes among the uplink subframes are assigned to an access zone for the mobile station, a third number of subframes among the downlink subframes and a fourth number of subframes among the uplink subframes are assigned to a relay zone for the base station, and the first number to the fourth number are predetermined.

In the aforementioned aspect of the present invention, the access zone may be followed by the relay zone in one frame. The first number of subframes may be at least one subframe transmitted first among the downlink subframes. The second number of subframes may be at least one subframe transmitted first among the uplink subframes. The third number of subframes may be at least one subframe transmitted last among the downlink subframes. The fourth number of subframes may be at least one subframe transmitted last among the uplink subframes.

In addition, the first number of subframes and third number of subframes may be determined based on hybrid automatic repeat request (HARQ) timing.

In addition, an HARQ subpacket may be transmitted through at least one subframe among the first number of subframes. An acknowledgement/not-acknowledgement (ACK/NACK) signal corresponding to the HARQ subpacket may be transmitted through any one subframe among the third number of subframes.

In addition, the second number of subframes and fourth number of subframes may be determined based on HARQ timing.

In addition, an HARQ subpacket may be transmitted through at least one subframe among the second number of subframes. An ACK/NACK signal corresponding to the HARQ subpacket may be transmitted through any one subframe among the fourth number of subframes.

In addition, if a ratio of the uplink subframes and the downlink subframes is 5:3, a ratio of a subframe for the access zone among the downlink subframes, a subframe for the relay zone among the downlink subframes, a subframe for the access zone among the uplink subframes, and a subframe for the relay zone among the uplink subframes may be 3:2:2:1 or 2:3:1:2.

In addition, at least two of the first number to the fourth number may be determined identically.

According to another aspect of the present invention, a data processing method for an ACK/NACK signal in a relay station communicating with any one of a mobile station and a base station is provided. The method includes: determining a radio resource for data used for communication with any one of the mobile station and the base station; and determining a radio resource for the ACK/NACK signal corresponding to the data, wherein the data and the ACK/NACK signal are transmitted by using an uplink frame and downlink frame including a plurality of subframes, each of the uplink frame and the downlink frame includes an access zone for the mobile station and the relay zone for the base station, and a radio resource for at least any one of the data and the ACK/NACK signal is determined based on the number of subframes included at least in the access zone or the relay zone.

In the aforementioned aspect of the present invention, a frequency at which the uplink frame may be transmitted is different from a frequency at which the downlink frame is transmitted.

In addition, the data may be transmitted through at least one downlink subframe included in the downlink frame. The ACK/NACK signal may be transmitted through an uplink subframe included in the uplink frame. Each of an index of a frame in which the ACK/NACK signal is transmitted and an index of a subframe in which the ACK/NACK signal is transmitted may be determined based on the number of uplink subframes included at least in the access zone or the relay zone.

In addition, the data may be transmitted through at least one uplink subframe included in the uplink frame. The ACK/NACK signal may be transmitted through a downlink subframe included in the downlink frame. Each of an index of a frame in which the data is transmitted and an index of a subframe in which the data is transmitted may be determined based on the number of uplink subframes included at least in the access zone or the relay zone. An index of a frame in which the ACK/NACK signal is transmitted may be determined based on the number of downlink subframes included at least in the access zone or the relay zone.

In addition, the data may be transmitted through at least one downlink subframe included in the downlink frame. The ACK/NACK signal may be transmitted through an uplink subframe included in the uplink frame. Each of an index of a frame in which the ACK/NACK signal is transmitted and an index of a subframe in which ACK/NACK signal is transmitted may be determined based on the number of uplink subframes included at least in the access zone or the relay zone and the number of downlink subframes included in the access zone or the relay zone.

In addition, the data may be transmitted through at least one uplink subframe included in the uplink frame. The ACK/NACK signal may be transmitted through a downlink subframe included in the downlink frame. Each of an index of a frame in which the data is transmitted and an index of a subframe in which data is transmitted may be determined based on the number of uplink subframes included at least in the access zone or the relay zone and the number of downlink subframes included in the access zone or the relay zone. An index of a frame in which the ACK/NACK signal is transmitted may be determined based on the number of uplink subframes included at least in the access zone or the relay zone and the number of downlink subframes included in the access zone or the relay zone.

In addition, each of the subframes may include a plurality of orthogonal frequency division multiple access (OFDMA) symbols.

According to another aspect of the present invention, a method of communicating with a mobile station and a base station by using a frame in a wireless communication system employing a relay station is provided. The method includes: configuring one frame by multiplexing an access zone and a relay zone on the basis of a subframe for a first system and a subframe for a second system in one frame; and communicating with at least any one of the mobile station and the base station by using the frame including the access zone and the relay zone, wherein each of the subframe for the first system and the subframe for the second system includes a downlink subframe and an uplink subframe, and each of the access zone and the relay zone includes a downlink subframe and an uplink subframe.

In the aforementioned aspect of the present invention, the first system may be an institute of electrical and electronics engineers (IEEE) 802.16e system. The second system may be an IEEE 802.16m system.

In addition, the subframe for the first system and the subframe for the second system may be multiplexed in a time division multiplexing (TDM) manner in the frame including the subframe for the first system and the subframe for the second system.

In addition, a downlink subframe among the subframes for the first system may correspond to a downlink access zone. A downlink subframe among the subframes for the second system may correspond to a downlink relay zone. An uplink subframe among the subframes for the first system may correspond to an uplink access zone. An uplink subframe among the subframes for the second system may correspond to an uplink relay zone.

In addition, the method may further include determining HARQ timing on the basis of a structure of the subframe for the first system and the subframe for the second system.

Advantageous Effects

According to the present invention, timing for a hybrid automatic repeat request (HARQ) operation can be determined in a case where an access zone and a relay zone are included in a frame. Communication can be performed with improved performance through the HARQ timing based on the present invention.

DESCRIPTION OF DRAWINGS

FIG. 15 shows structure simplified from a frame structure of FIG. 24 on a subframe basis.

MODE FOR INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is an evolution of the 3GPP LTE. For clarity, the following description will focus on the IEEE 802.16m. However, technical features of the present invention are not limited thereto.

Figure 1:
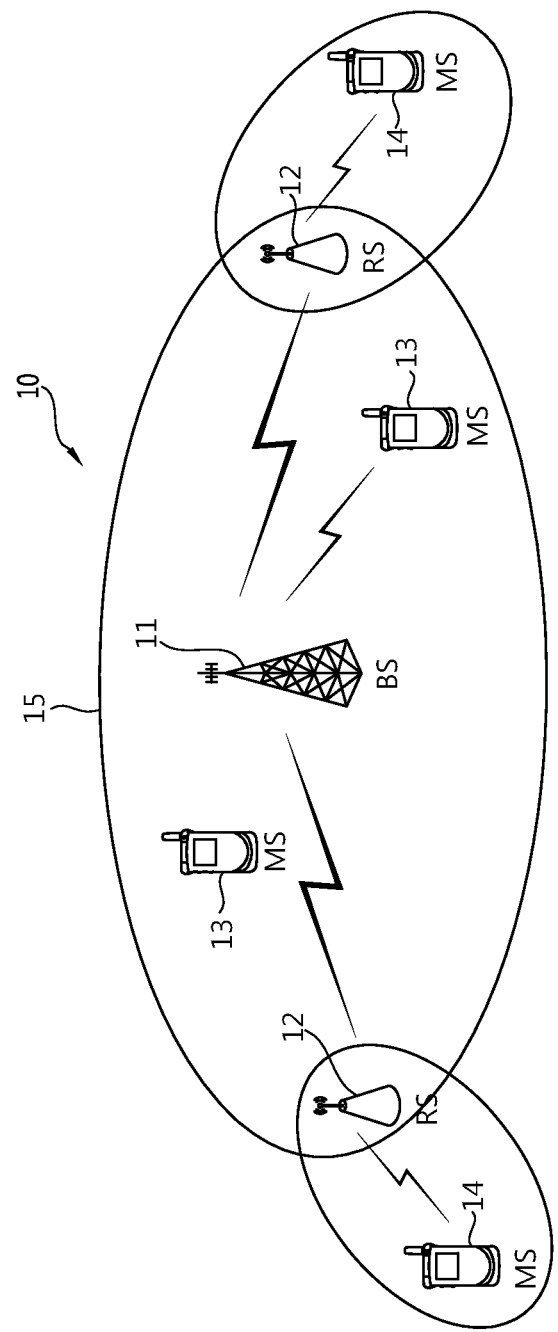
FIG. 1 shows a wireless communication system employing a relay station.

FIG. 1 shows a wireless communication system employing a relay station.

Referring to FIG. 1, a wireless communication system 10 employing a relay station (RS) 12 includes at least one base station (BS) 11. Each BS 11 provides a communication service to a specific geographical region 15 generally referred to as a cell. The cell can be divided into a plurality of regions, and each region can be referred to as a sector. One or more cells may exist in the coverage of one BS. One or more BSs may exist in one cell. The BS 11 is generally a fixed station that communicates with a mobile station (MS) 13 and may be referred to as another terminology, such as an evolved node-B (eNB), a base transceiver system (BTS), an access point, an access network (AN), an advanced BS (ABS), a node (or antenna node) etc. The BS 11 can perform functions such as connectivity between the RS 12 and an MS 14, management, control, resource allocation, etc.

The RS 12 is a device for relaying a signal between the BS 11 and the MS 14, and is also referred to as another terminology such as a relay node (RN), a repeater, an advanced RS (ARS), etc. A relay scheme used in the RS may be either amplify and forward (AF) or decode and forward (DF), and the technical features of the present invention are not limited thereto.

The MSs 13 and 14 may be fixed or mobile, and may be referred to as another terminology, such as an advanced mobile station (AMS), a user terminal (UT), a subscriber station (SS), a wireless device, a personal digital assistant (PDA), a wireless modem, a handheld device, an access terminal (AT), a user equipment (UE), etc. Hereinafter, a macro MS denotes an MS that directly communicates with the BS 11, and a relay MS denotes an MS that communicates with the RS. To improve a data transfer rate depending on a diversity effect, a macro MS 13 located in the cell of the BS 11 can also communicate with the BS 11 via the RS 12.

Between the BS and the macro MS, a downlink (DL) denotes communication from the BS to the macro MS, and an uplink (UL) denotes communication from the macro MS to the BS. Between the BS and the RS, the DL denotes communication from the BS to the RS, and the UL denotes communication from the RS to the BS. Between the RS and the relay MS, the DL denotes communication from the RS to the relay MS, and the UL denotes communication from the relay MS to the RS.

Figure 2:
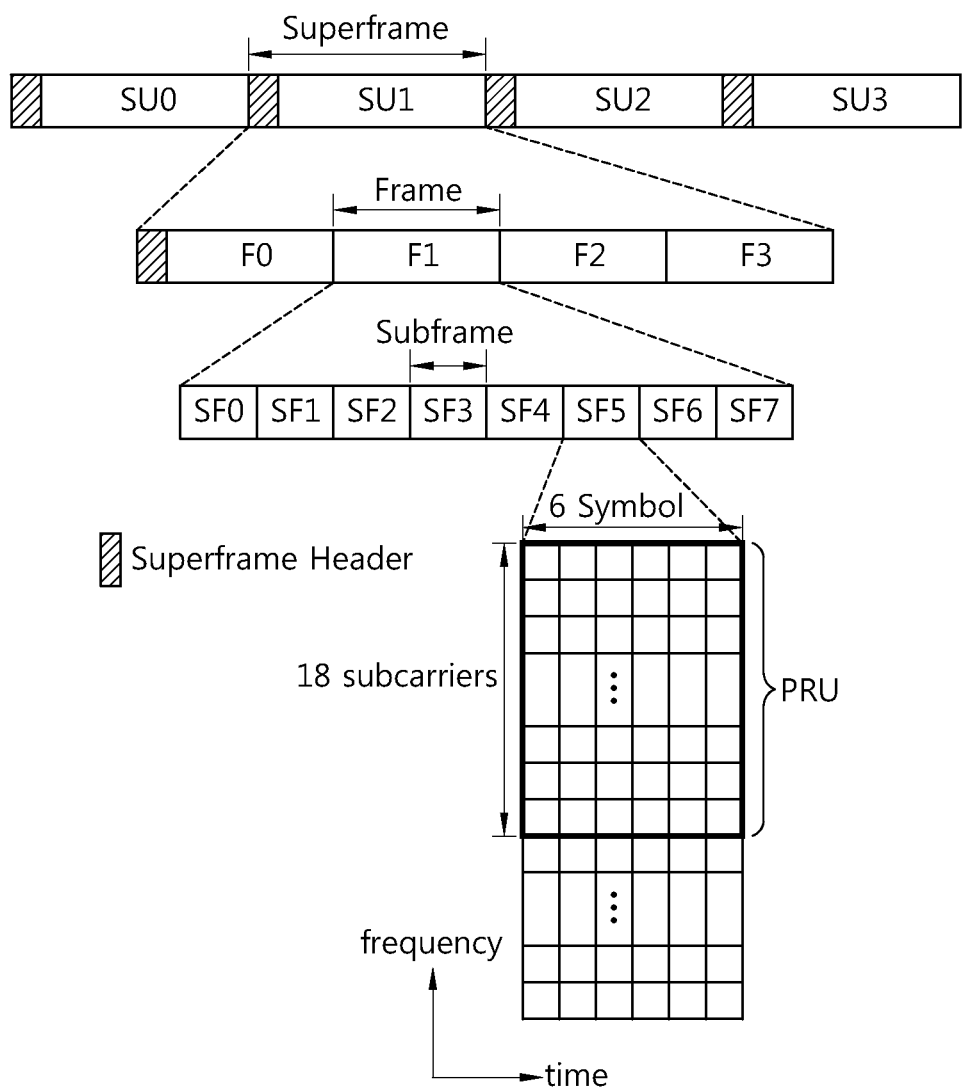
FIG. 2 shows an example of a frame structure.

FIG. 2 shows an example of a frame structure.

Referring to FIG. 2, a superframe (SF) includes a superframe header (SFH) and four frames F0, F1, F2, and F3. Each frame may have the same length in the SF. Although it is shown that each SF has a size of 20 milliseconds (ms) and each frame has a size of 5 ms, the present invention is not limited thereto. A length of the SF, the number of frames included in the SF, the number of subframes included in the frame, or the like can change variously. The number of subframes included in the frame may change variously according to a channel bandwidth and a cyclic prefix (CP) length.

One frame includes a plurality of subframes SF0, SF1, SF2, SF3, SF4, SF5, SF6, and SF7. Each subframe can be used for UL or DL transmission. One subframe includes a plurality of orthogonal frequency division multiplexing (OFDM) symbols or orthogonal frequency division multiple access (OFDMA) symbols in a time domain, and includes a plurality of subcarriers in a frequency domain. An OFDM symbol is for representing one symbol period, and can be referred to as other terminologies such as an OFDMA symbol, an SC-FDMA symbol, etc., according to a multiple access scheme. The subframe can consist of 5, 6, 7, or 9 OFDMA symbols. However, this is for exemplary purposes only, and thus the number of OFDMA symbols included in the subframe is not limited thereto. The number of OFDMA symbols included in the subframe may change variously according to a channel bandwidth and a CP length. A subframe type may be defined according to the number of OFDMA symbols included in the subframe. For example, it can be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols. One frame may include subframes each having the same type. Alternatively, one frame may include subframes each having a different type. That is, the number of OFDMA symbols included in each subframe may be identical or different in one frame. Alternatively, the number of OFDM symbols included in at least one subframe of one frame may be different from the number of OFDMA symbols of the remaining subframes of the frame.

Time division duplexing (TDD) or frequency division duplexing (FDD) may be applied to the frame. In the TDD, each subframe is used in UL or DL transmission at the same frequency and at a different time. That is, subframes included in a TDD frame are divided into a UL subframe and a DL subframe in the time domain. A switching point is a point at which a transmission direction changes from a UL zone to a DL zone or from the DL zone to the UL zone. In the TDD, the number of switching points in each frame may be 2. In the FDD, each subframe is used in UL or DL transmission at the same time and at a different frequency. That is, subframes included in an FDD frame are divided into a UL subframe and a DL subframe in the frequency domain. UL transmission and DL transmission occupy different frequency bands and can be simultaneously performed.

Figure 3:
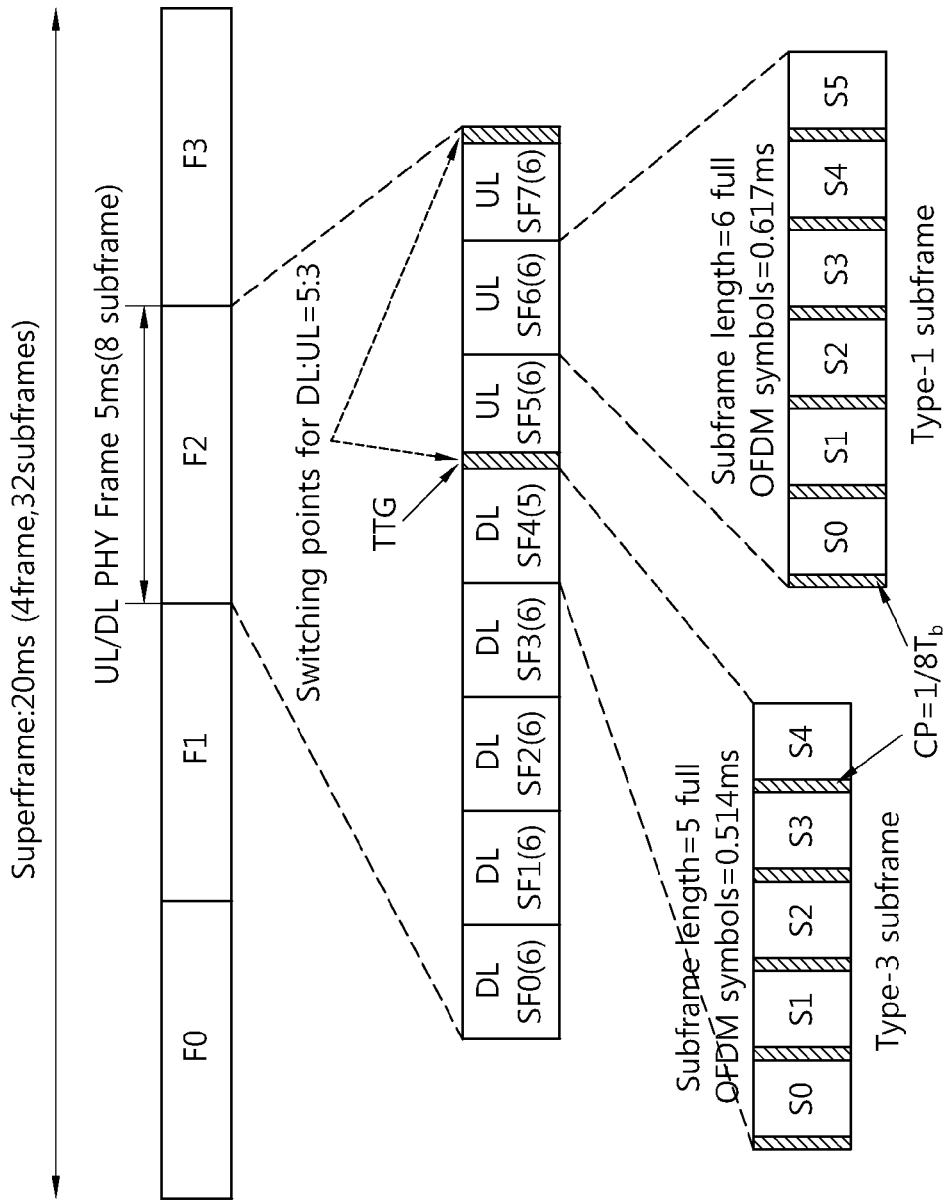
FIG. 3 shows an example of a time division duplexing (TDD) frame structure.

FIG. 3 shows an example of a TDD frame structure. In this structure, G=⅛. A superframe having a length of 20 ms consists of 4 frames F0, F1, F2, and F3 each having a length of 5 ms. One frame consists of 8 subframes SF0, SF1, SF2, SF3, SF4, SF5, SF6, and SF7, and a ratio of a DL subframe to a UL subframe is 5:3. The TDD frame structure of FIG. 3 can be used when a bandwidth is 5 MHz, 10 MHz, or 20 MHz. The last DL subframe SF4 includes 5 OFDM symbols, and the remaining subframes include 6 subframes. A TTG illustrated herein indicates a transition gap between a UL subframe and a DL subframe.

Figure 4:
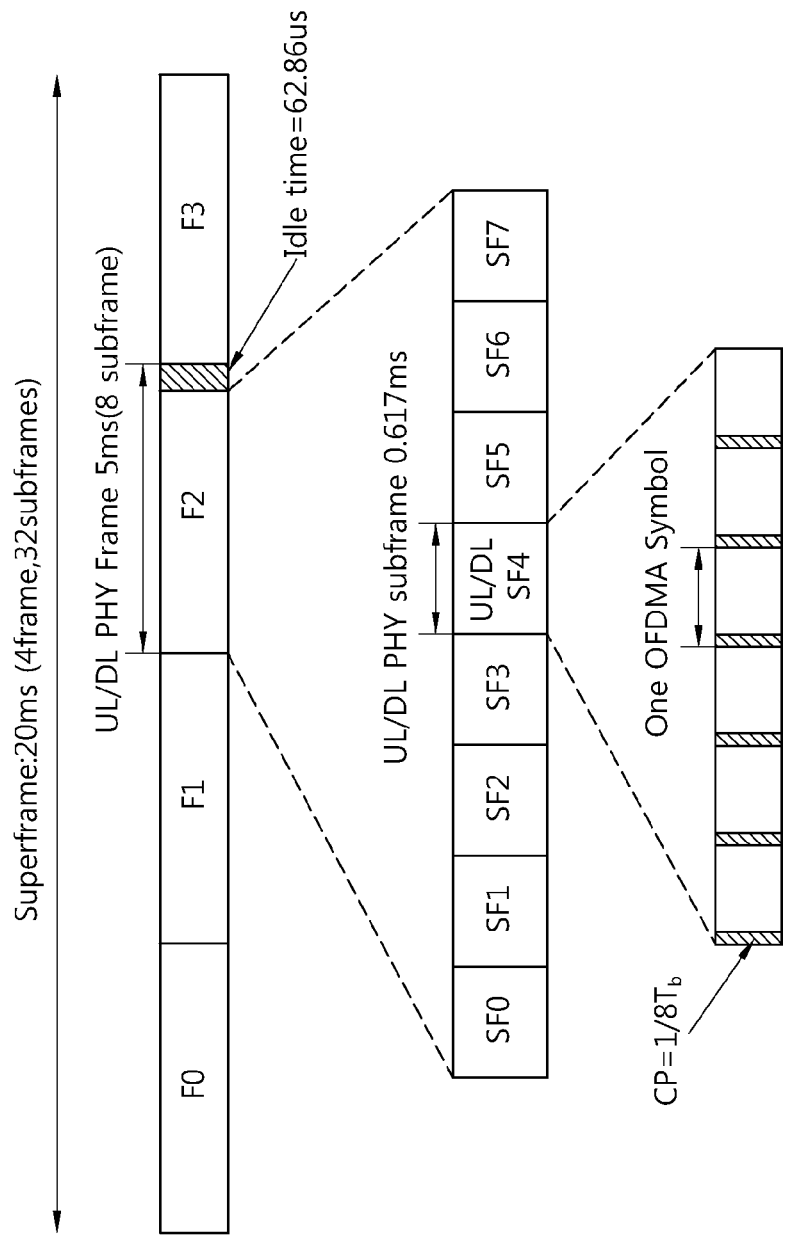
FIG. 4 shows an example of a frequency division duplexing (FDD) frame structure.

FIG. 4 shows an example of an FDD frame structure. In this structure, G=⅛. A superframe having a length of 20 ms consists of 4 frames F0, F1, F2, and F3 each having a length of 5 ms. One frame consists of 8 subframes SF0, SF1, SF2, SF3, SF4, SF5, SF6, and SF7, and all subframes include a DL zone and a UL zone. The FDD frame structure of FIG. 4 can be used when a bandwidth is 5 MHz, 10 MHz, or 20 MHz.

An example of an HARQ scheme applied to a communication method using the aforementioned TDD frame or FDD frame is as follows. In order to apply the HARQ scheme based on the TDD frame or the FDD frame, information regarding HARQ timing must be determined. The HARQ timing includes timing for transmitting information regarding allocation of a radio resource for an HARQ operation, timing for transmitting an HARQ subpacket, timing for transmitting ACK/NACK corresponding to the HARQ subpacket, and timing for retransmitting the HARQ subpacket. The information regarding the allocation of the radio resource for the HARQ operation can be included in an A-MAP IE.

Since the TDD frame or the FDD frame can be expressed in a frame unit and in a subframe unit as described above, the information regarding HARQ timing can be expressed with an index regarding a frame and a subframe. That is, the information regarding HARQ timing can be expressed with a frame index and a subframe index. In addition, in an 802.16m system, the subframe index can also be expressed with an AAI subframe index.

The frame index can be defined to 0 to 3. In addition, in case of using the FDD frame, an index of a DL subframe (i.e., DL AAI subframe) or a UL subframe (i.e., UL AAI subframe) can be defined to 0 to F-1. F denotes the number of subframes that can belong to one frame. An index of a first subframe included in one frame can be determined to 0, and an index of a last subframe can be determined to F-1. In addition, in case of using the TDD frame, a DL subframe (i.e., DL AAI subframe) can be determined to 0 to D-1, and a UL subframe (i.e., UL AAI subframe) can be determined to 0 to U-1. D may denote the number of DL subframes included in one frame, and U may denote the number of UL subframes included in one frame. Hereinafter, HARQ timing will be described on the basis of a subframe index (i.e., AAI subframe index) and a frame index.

Hereinafter, an example of determining DL HARQ timing when using an FDD frame will be described. Table 1 below explains DL HARQ timing when using the FDD frame.

TABLE 1

| Content | AAI Subframe Index | Frame Index |
|---|---|---|
| Basic Assignment A-MAP IE Tx in DL | l | i |
| HARQ Subpacket Tx in DL | m = l | i |
| HARQ feedback in UL | n = ceil(m + F/2)modF | $j = \left(i + \text{floor}\left(\frac{\text{ceil}(m + F/2)}{F}\right) + z\right) \bmod 4$ |

In Table 1, "Basic Assignment A-MAP IE Tx in DL" denotes timing for transmitting "A-MAP IE" including information regarding allocation of a radio resource in a downlink, "HARQ Subpacket Tx in DL" denotes timing for transmitting an HARQ subpacket transmitted in a downlink, and "HARQ feedback in UL" denotes timing for transmitting an ACK/NACK feedback for the HARQ subpacket in an uplink. In the following table and equation, floor(x) denotes a function for returning the greatest integer less than or equal to x, ceil(x) denotes a function for returning the smallest integer greater than or equal to x, and mod denotes a modulo operation. In addition, l and m are variables for indicating a subframe index. i and j are variables for indicating a frame index and are determined to any one of 0 to 3. In general, l is determined to any one of 0 to F-1. However, when a long transmission time interval (TTI) is transmitted, l is determined to 0 to F-4. F denotes the number of subframes included in one frame. n denotes an index for expressing a UL subframe. Meanwhile, z denotes an offset of a DL HARQ feedback offset, and is defined by Equation 1. Hereinafter, $N_{TTI}$ denotes the number of subframes across which an HARQ subframe spans. It is set to 1 in case of a default transmission time interval (TTI), and is set to 4 in case of a long TTI. In addition, hereinafter, $T_{proc}$ is a processing time, and can denote a time required until a UL HARQ feedback is transmitted after transmitting an A-MAP IE and an HARQ subpacket in a downlink or can denote a processing time required until the HARQ subpacket is transmitted in an uplink after transmitting the A-MAP IE in a downlink on the basis of the number of subframes. The processing time $T_{proc}$ can be classified variously according to a link type (i.e., a downlink and an uplink). For example, when DL HARQ timing is determined in an FDD frame as shown in Table 1, the processing time can be expressed by $T_{DL\_Rx\_Processing}$ or a DL reception processing time. $T_{DL\_Rx\_Processing}$ denotes a data burst reception (Rx) processing time required by the MS.

$$z = \begin{cases} 0, & \text{if } ((\text{ceil}(F/2) - N_{TTI}) \geq T_{proc}) \\ 1, & \text{else} \end{cases} \quad \text{[Equation 1]}$$

Figure 5:
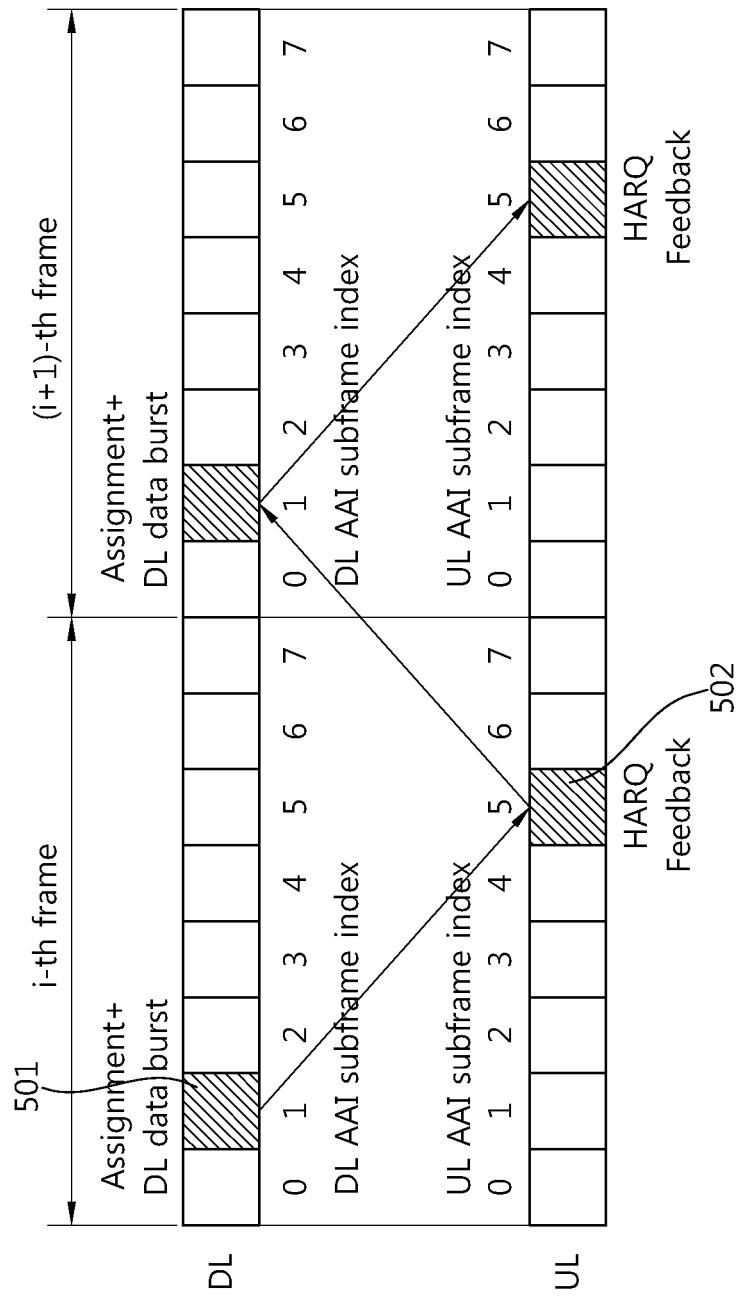
FIG. 5 shows an example of determining hybrid automatic repeat request (HARQ) timing when using an FDD frame.

FIG. 5 shows an example of determining HARQ timing when using an FDD frame. In the example of FIG. 5, a processing time $T_{proc}$ is set to 3.

As shown in FIG. 5, if a subframe index of an A-MAP IE is determined to 1 and a frame index is determined to i, according to the result of Table 1 and Equation 1, an HARQ subpacket (i.e., a DL data burst) is transmitted through the same frame and the same subframe as the A-MAP IE, and the HARQ subpacket (i.e., a DL data burst) can be transmitted through a subframe indexed with 5. In other words, if DL HARQ timing is determined, a DL data burst and an A-MAP IE for allocation of a radio resource can be transmitted through the same DL subframe 501, and an ACK/NACK signal for the DL data burst can be transmitted through a UL subframe 502 by considering the processing time. The example of FIG. 5 is a case of transmitting an HARQ subpacket by using a default TTI. The example of FIG. 5 is applied to all of 5, 10, 15, and 20 MHz-band channels.

Hereinafter, an example of determining UL HARQ timing when using an FDD frame will be described. Table 2 below explains UL HARQ timing when using the FDD frame.

TABLE 2

| Content | AAI Subframe Index | Frame Index |
|---|---|---|
| Basic Assignment A-MAP Tx IE in DL | l | i |
| HARQ Subpacket Tx in UL | m = n where<br>n = ceil(l + F/2)modF | $j = \left(i + \text{floor}\left(\frac{\text{ceil}(l + F/2)}{F}\right) + v\right) \bmod 4$ |
| HARQ feedback in DL | l | $k = \left(j + \text{floor}\left(\frac{m + F/2}{F}\right) + w\right) \bmod 4$ |

TABLE 2-continued

| Content | AAI Subframe Index Frame Index |
|---|---|
| HARQ Subpacket ReTx in UL  m | $p = \left(k + \text{floor}\left(\frac{\text{ceil}(1 + F/2)}{F}\right) + v\right) \bmod 4$ |

In Table 2, "Basic Assignment A-MAP IE Tx in DL" denotes timing for transmitting "A-MAP IE" including information regarding allocation of a radio resource in a downlink, "HARQ Subpacket Tx in UL" denotes timing for transmitting an HARQ subpacket transmitted in an uplink, and "HARQ feedback in DL" denotes timing for transmitting an ACK/NACK feedback for the HARQ subpacket in a downlink. In addition, "HARQ Subpacket ReTx in UL" denotes timing for retransmitting a corresponding HARQ subpacket when a NACK feedback is transmitted. In Table 2, j, k, and p denote variables for expressing a frame index, and are determined to any one of 0 to 3. v denotes a UL HARQ transmission offset, and w denotes a UL HARQ feedback offset. v and w are determined by Equations 2 and 3 below.

$$v = \begin{cases} 0, & \text{if } ((\text{ceil}(F/2) - 1) \geq T_{proc}) \\ 1, & \text{else} \end{cases} \quad \text{[Equation 2]}$$

In Equation 2, since a processing time in use is for HARQ subpacket transmission through an uplink, it can be expressed by a UL transmission processing time or $T_{UL\_Tx\_Processing}$. The UL transmission processing time denotes a data burst transmission (Tx) processing time required by the MS, and can be expressed in a subframe unit.

$$w = \begin{cases} 0, & \text{if } ((\text{floor}(F/2) - N_{TTI}) \geq T_{proc}) \\ 1, & \text{else} \end{cases} \quad \text{[Equation 3]}$$

In Equation 3, since a processing time in use is for HARQ feedback transmission through an uplink, it can be expressed by a UL transmission processing time or $T_{UL\_Rx\_Processing}$. The UL reception processing time denotes a data burst Rx processing time required by the MS, and can be expressed in a subframe unit.

Figure 6:
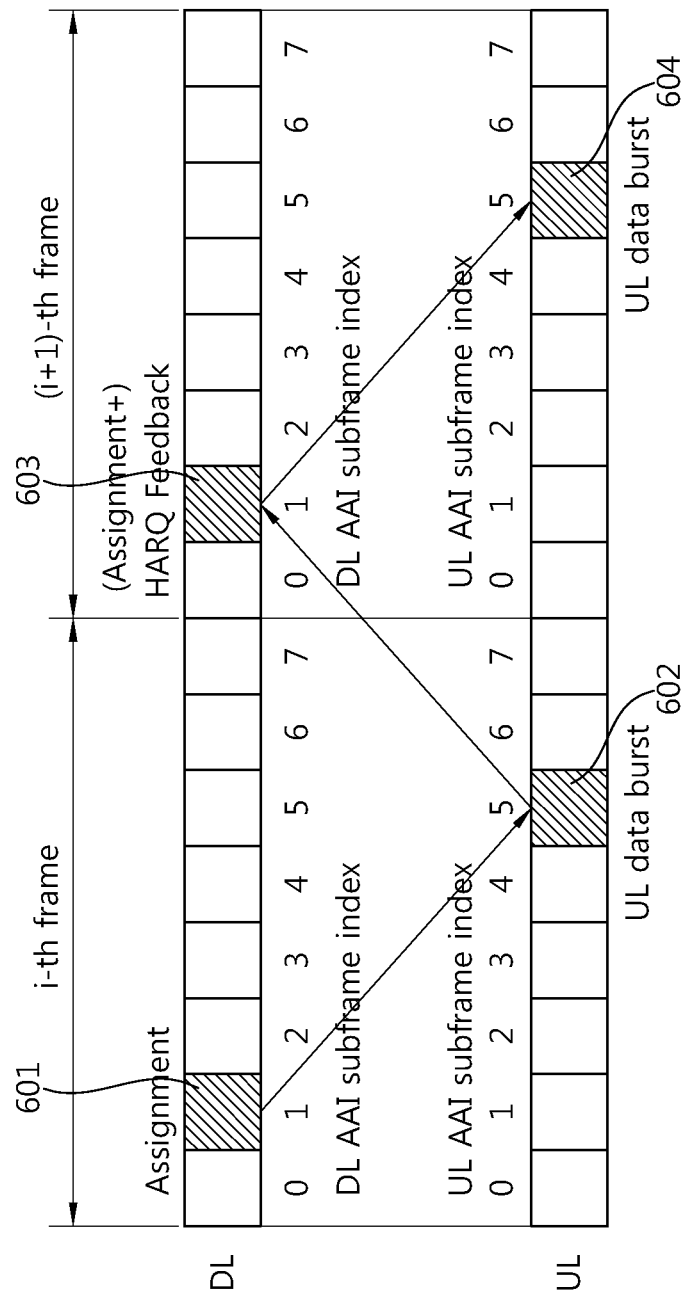
FIG. 6 shows an example of determining uplink HARQ timing when using an FDD frame.

FIG. 6 shows an example of determining UL HARD timing when using an FDD frame. In the example of FIG. 6, a processing time $T_{proc}$ is set to 3. As shown in FIG. 6, if a subframe index of an A-MAP IE is determined to 1 and a frame index is determined to i, according to Table 2, an HARQ subpacket (i.e., a UL data burst) is transmitted through a subframe indexed with 5. Further, according to Table 2, an HARQ feedback corresponding to an HARQ subpacket is transmitted through a subframe indexed with 1 among subframes included in a frame indexed with i+1. Furthermore, an HARQ subpacket (i.e., a UL data burst) retransmitted in accordance with a corresponding HARQ feedback is transmitted through a subframe indexed with 5 among subframes included in a frame indexed with i+1. The example of FIG. 6 is a case of transmitting an HARQ subpacket by using a default TTI. The example of FIG. 6 is applied to all of 5, 10, 15, and 20 MHz-band channels.

In other words, in the example of FIG. 6, if UL HARQ timing is determined, an A-MAP IE for allocation of a radio resource can be transmitted through a DL subframe 601, and a corresponding UL data burst can be transmitted through a UL subframe 602 by considering the processing time. That is, the A-MAP IE and the UL data burst can be transmitted through different subframes. Meanwhile, a DL subframe 603 in which an HARQ feedback corresponding to the UL data burst is transmitted has the same subframe index as the DL subframe 601 in which an A-MAP IE is transmitted. In addition, a UL subframe 604 in which a retransmitted HARQ subpacket is transmitted has the same subframe index as the UL subframe 602 in which the previously transmitted HARQ subpacket is transmitted. After transmitting the data burst, timing for transmitting an HARQ feedback corresponding thereto is determined based on a process time.

Hereinafter, an example of determining DL HARQ timing when using a TDD frame will be described. Table 3 below explains DL HARQ timing when using the TDD frame.

TABLE 3

| Content | AAI Subframe Index | Frame Index |
|---|---|---|
| Basic Assignment A-MAP IE Tx in DL | 1 | i |
| HARQ Subpacket Tx in DL | m = l | i |
| HARQ feedback in UL | For D > U $n = \begin{cases} 0, & \text{for } 0 \leq m < K \\ m - K, & \text{for } K \leq m < U + K \\ U - 1, & \text{for } U + K \leq m < D \end{cases}$ For $D \leq U$, $n = m - K$ | j = (i + z) mod 4 |

In Table 3, "Basic Assignment A-MAP IE Tx in DL" denotes timing for transmitting "A-MAP IE" including information regarding allocation of a radio resource in a downlink, "HARQ Subpacket Tx in DL" denotes timing for transmitting an HARQ subpacket transmitted in a downlink, and "HARQ feedback in UL" denotes timing for transmitting an ACK/NACK feedback for the HARQ subpacket in an uplink. Hereinafter, D denotes the number of DL subframes included in one TDD frame, and U denotes the number of UL subframes included in one TDD frame. K denotes a variable used to determine a subframe index, and is determined to $$K = -\text{ceil}\left(\frac{U - D}{2}\right)$$

when D is less than U and otherwise determined to $$K = \text{floor}\left(\frac{D - U}{2}\right).$$

Meanwhile, if DL HARQ timing is determined in the TDD frame, since the A-MAP IE is transmitted through a DL subframe, a value l is determined to 0 to D-1. The content of Table 3 is also applied when an HARQ subpacket is transmitted by using a long TTI. However, if the HARQ subpacket is transmitted through a subframe of which a value l is not 0, it is transmitted through a 0-th DL AAI subframe of the (i+1)-th frame. z denotes a DL HARQ feedback offset, and is determined by Equation 4 below.

$$z = \begin{cases} 0, & \text{if } ((D - m - N_{TTI} + n) \geq T_{proc}) \\ 1, & \text{else} \end{cases} \quad \text{[Equation 4]}$$

In Equation 4, $N_{TTI}$ is set to 1 in case of a default TTI, and is set to D in case of a long TTI. In Equation 4, a processing time $T_{proc}$ can be expressed by a DL reception processing time that can be denoted by $T_{DL\_Rx\_Processing}$.

Figure 7:
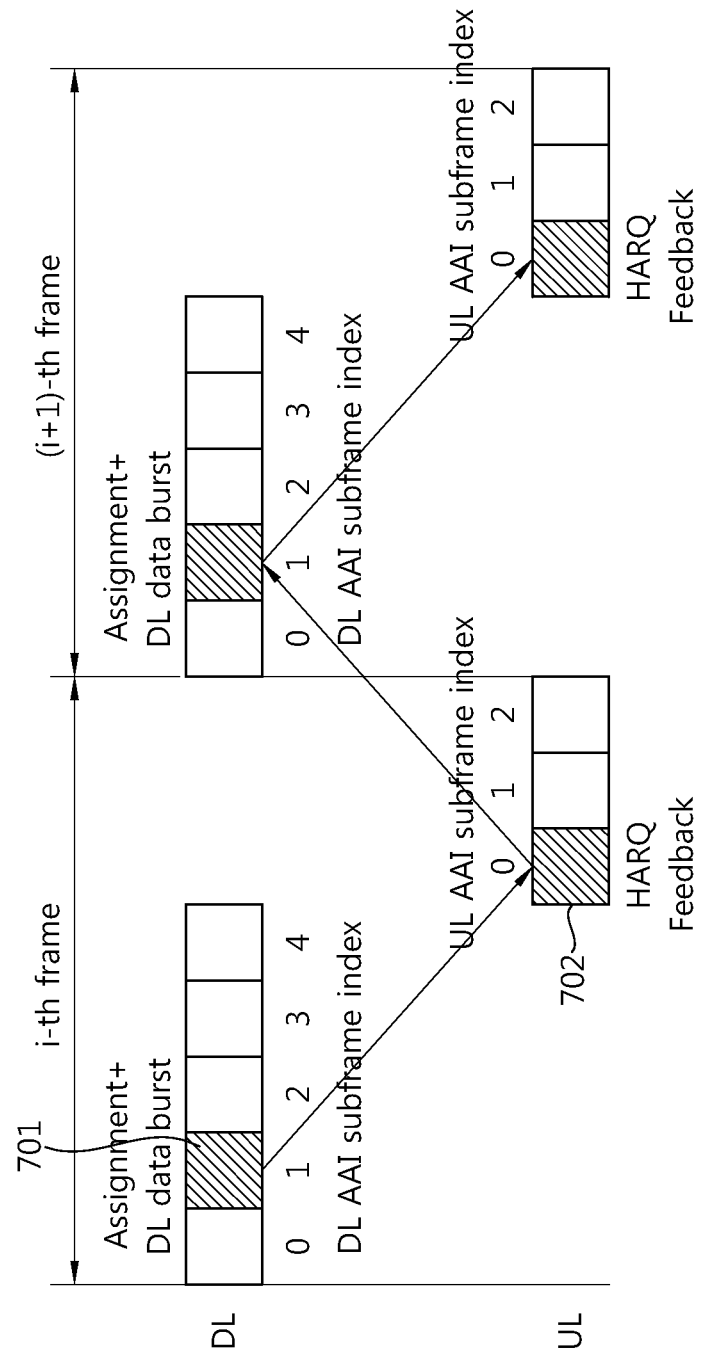
FIG. 7 shows an example of determining downlink HARQ timing when using a TDD frame.

FIG. 7 shows an example of determining DL HARQ timing when using a TDD frame. In the example of FIG. 7, a processing time $T_{Proc}$ is set to 3. As shown in FIG. 7, if a subframe index of an A-MAP IE is determined to 1 and a frame index is determined to i, according to Table 3, an HARQ subpacket (i.e., a DL data burst) is transmitted through the same frame and the same subframe as the A-MAP IE, and the HARQ subpacket (i.e., a DL data burst) is transmitted through a UL subframe indexed with 0. In other words, if DL HARQ timing is determined, a DL data burst and an A-MAP IE for allocation of a radio resource can be transmitted through the same DL subframe 701, and an ACK/NACK signal for the DL data burst can be transmitted through a UL subframe 702 by considering the processing time. The example of FIG. 7 is a case of transmitting an HARQ subpacket by using a default TTI. The example of FIG. 7 is applied to all of 5, 10, 15, and 20 MHz-band channels.

Table 4 below explains UL HARQ timing when using the TDD frame.

TABLE 4

| Content | AAI Subframe Index | Frame Index |
|---|---|---|
| Basic Assignment A-MAP IE Tx in DL | 1 | i |
| HARQ Subpacket Tx in | For $D \geq U$ <br> $m = \begin{cases} 0, & \text{for } 0 \leq l < K \\ l - K, & \text{for } K \leq l < U + K \\ U - 1, & \text{for } U + K \leq l < D \end{cases}$ <br><br> For $1 < D < U$ <br> $m = \begin{cases} 0, \ldots, \text{ or } l - K, & \text{for } l = 0 \\ l - K, & \text{for } 0 < l < D - 1 \\ l - K, \ldots, \text{ or } U - 1, & \text{for } l = D - 1 \end{cases}$ <br> For $D = 1$ <br> $m = 0, \ldots, \text{ or } U - 1$ for $l = 0$ | $j = (i + v) \bmod 4$ |
| HARQ feedback in DL | 1 | $k = (j + 1 + w) \bmod 4$ |
| HARQ Subpacket ReTx in UL | m | $p = (k + v) \bmod 4$ |

In Table 4, "Basic Assignment A-MAP IE Tx in DL" denotes timing for transmitting "A-MAP IE" including information regarding allocation of a radio resource in a downlink, "HARQ Subpacket Tx in UL" denotes timing for transmitting an HARQ subpacket transmitted in an uplink, and "HARQ feedback in DL" denotes timing for transmitting an ACK/NACK feedback for the HARQ subpacket in a downlink. In addition, "HARQ Subpacket ReTx in UL" denotes timing for retransmitting a corresponding HARQ subpacket when a NACK feedback is transmitted. As described above, D denotes the number of DL subframes included in one TDD frame, and U denotes the number of UL subframes included in one TDD frame. K denotes a variable used to determine a subframe index, and is determined to $$K = -\text{ceil}\left(\frac{U - D}{2}\right)$$

when D is less than U and otherwise determined to $$K = \text{floor}\left(\frac{D - U}{2}\right).$$

Meanwhile, since the A-MAP IE is transmitted through a DL subframe, a value l is determined to 0 to D-1.

In Table 4, j, k, and p denote variables for expressing a frame index. The content of Table 4 is also applied when an HARQ subpacket is transmitted by using a long TTI. However, unlike a case where a default TTI is transmitted, each subpacket and feedback are transmitted by setting m=0.

In Table 4, v denotes a UL HARQ transmission offset, and w denotes a UL HARQ feedback offset. v and w are determined by Equations 5 and 6 below.

$$v = \begin{cases} 0, & \text{if } ((D - l - 1 + m) \geq T_{proc}) \\ 1, & \text{else} \end{cases} \quad \text{[Equation 5]}$$

A processing time of Equation 5 can be expressed by a UL transmission processing time or $T_{UL\_Tx\_Processing}$.

$$w = \begin{cases} 0, & \text{if } ((U - m - N_{TTI} + l) \geq T_{proc}) \\ 1, & \text{else} \end{cases} \quad \text{[Equation 6]}$$

In Equation 6, $N_{TTI}$ is set to 1 in case of a default TTI, and is set to D in case of a long TTI. In Equation 6, a processing time can be expressed by a UL reception processing time or $T_{UL\_Rx\_Processing}$.

Figure 8:
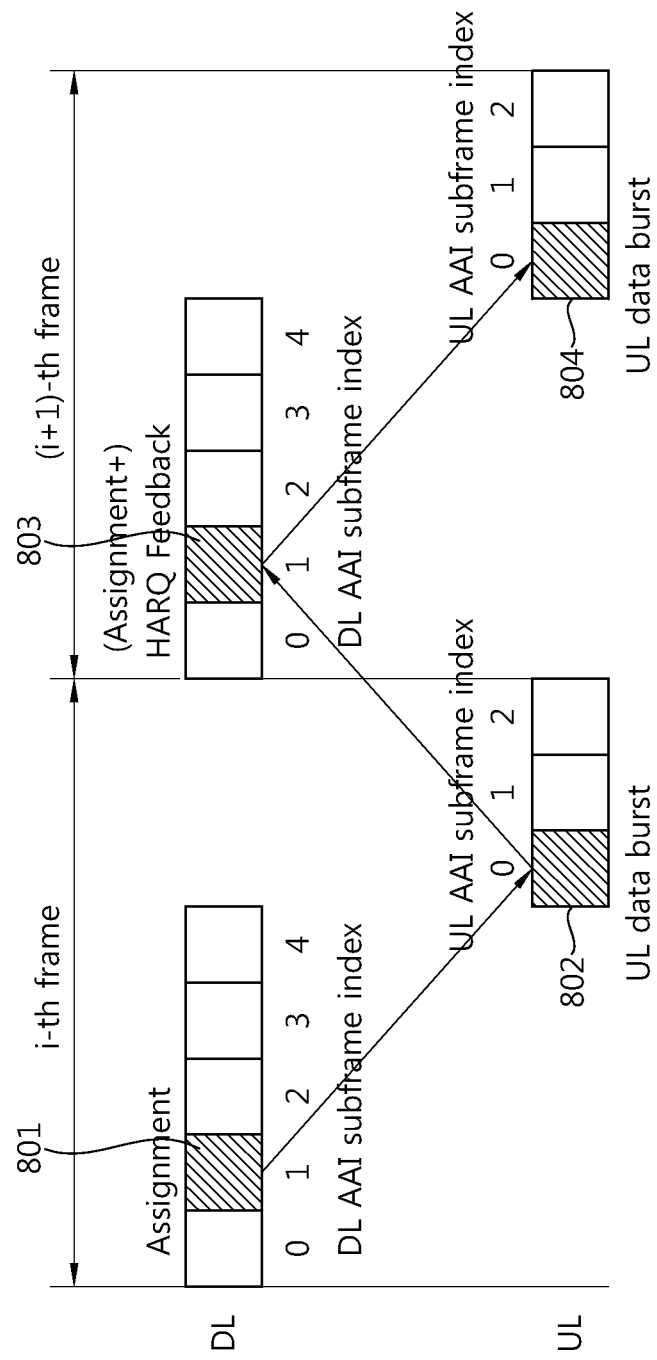
FIG. 8 shows an example of determining uplink HARQ timing when using a TDD frame.

FIG. 8 shows an example of determining UL HARQ timing when using a TDD frame. In the example of FIG. 8, a processing time $T_{proc}$ is set to 3. As shown in FIG. 8, if a subframe index of an A-MAP IE is determined to 1 and a frame index is determined to i, according to Table 4, an HARQ subpacket (i.e., a UL data burst) is transmitted through a UL subframe indexed with 0. Further, according to Table 4, an HARQ feedback corresponding to an HARQ subpacket (i.e., a UL data burst) is transmitted through a DL subframe indexed with 1 among subframes included in a frame indexed with i+1. Furthermore, according to Table 4, an HARQ subpacket (i.e., a UL data burst) retransmitted in accordance with a corresponding HARQ feedback is transmitted through a UL subframe indexed with 0 among subframes included in a frame indexed with i+1. The example of FIG. 8 is a case of transmitting an HARQ subpacket by using a default TTI. The example of FIG. 8 is applied to all of 5, 10, 15, and 20 MHz-band channels.

In other words, in the example of FIG. 8, if UL HARQ timing is determined, an A-MAP IE for allocation of a radio resource can be transmitted through a DL subframe 801, and a corresponding UL data burst can be transmitted through a UL subframe 802 by considering the processing time. That is, the A-MAP IE and the UL data burst can be transmitted through different subframes. Meanwhile, a DL subframe 803 in which an HARQ feedback corresponding to the UL data burst is transmitted has the same subframe index as the DL subframe 801 in which an A-MAP IE is transmitted. In addition, a UL subframe 804 in which a retransmitted HARQ subpacket is transmitted has the same subframe index as the UL subframe 802 in which the previously transmitted HARQ subpacket is transmitted. After transmitting the data burst, timing for transmitting an HARQ feedback corresponding thereto is determined based on a process time.

The aforementioned HARQ scheme based on HARQ timing is based on an OFDM/OFDMA system not employing a relay station, and a problem occurs when it is applied to a system employing the relay station. Hereinafter, an embodiment of applying the aforementioned HARQ scheme to the system employing the relay station will be described.

First Embodiment

In the first embodiment, an example of applying an HARQ scheme is explained when using a TDD frame. As described above, a method of determining HARQ timing based on Table 3 and Table 4 is based on a system not employing a relay station. Therefore, in order to directly apply the scheme of Table 3 and Table 4 to the system employing the relay station, there is a need to change a structure of a frame transmitted from the relay station.

Figure 9:
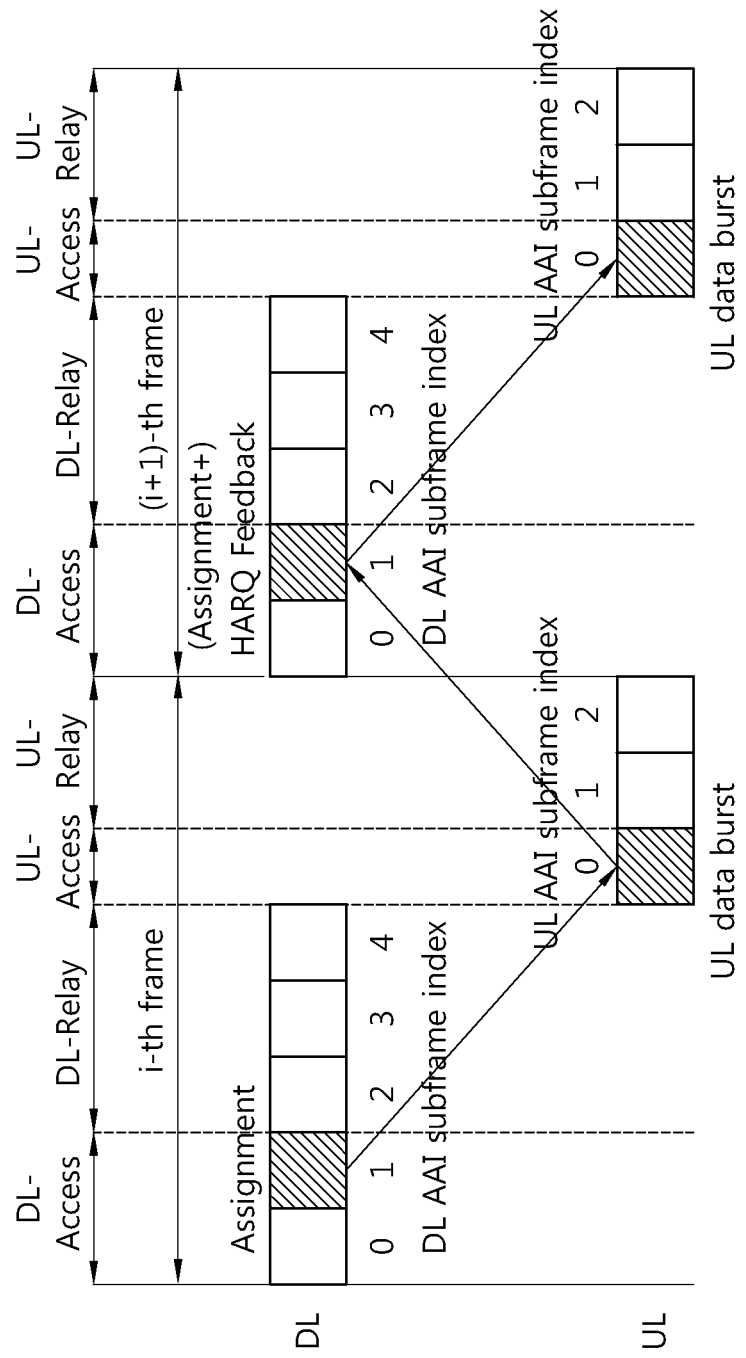
FIG. 9 shows a structure of a TDD frame transmitted from a relay station.

FIG. 9 shows a structure of a TDD frame transmitted from a relay station. As illustrated, the TDD frame transmitted from the relay station may include a downlink access zone, a downlink relay zone, an uplink access zone, and an uplink relay zone. An order of the access zone/relay zone and an order of the downlink/uplink can be changed. That is, the relay zone may be arranged before the access zone.

Each of the access zone and the relay zone can be divided in a subframe unit. The number of subframes included in the downlink access zone and the downlink relay zone can be expressed with a specific ratio. The number of subframes included in the uplink access zone and the uplink relay zone can be expressed with a specific ratio.

According to the first embodiment, some subframes among downlink subframes and some subframes among uplink subframes are assigned to an access zone, and other subframes among the downlink subframes and other subframes among the uplink subframes are assigned to a relay zone. More specifically, a first number of subframes transmitted first among the downlink subframes and a second number of subframes transmitted first among the uplink subframes can be assigned to the access zone. The transmitted first subframe implies at least one subframe located to the leftmost position of the downlink or uplink subframe. In addition, a third number of subframes transmitted last among the downlink subframes and a fourth number of subframes transmitted last among the uplink subframes can be assigned to the relay zone. The last transmitted subframe implies at least one subframe located to the rightmost position of the downlink or uplink subframe. The first number to the fourth number can be determined such that all of the numbers are identical to each other or only some of them are identical to each other or all of them are different from each other.

Subframes assigned to the same zone (i.e., access zone or relay zone) are subframes which are mapped to each other. A mapping relation between the subframes can be determined based on HARQ timing. That is, on the basis of the HARQ timing, an arrangement of a downlink access zone, downlink relay zone, uplink access zone, and uplink relay zone in a TDD frame can be determined. In other words, the first number to the fourth number can be determined based on HARQ timing. Hereinafter, a detailed example of determining the arrangement of the downlink access zone, downlink relay zone, uplink access zone, and uplink relay zone in the TDD frame will be described.

Figure 10:
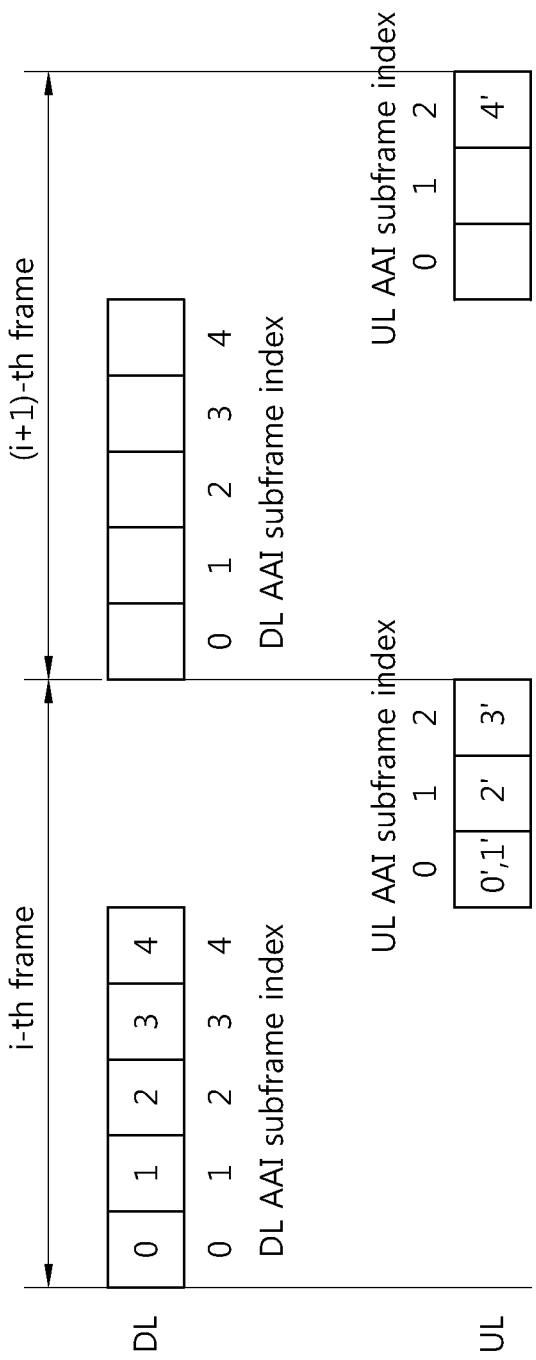
FIG. 10 shows an example in which a ratio of subframes assigned to a downlink and an uplink is determined to 5:3.

FIG. 10 shows an example in which a ratio of subframes assigned to a downlink and an uplink is determined to 5:3. For example, if a processing time based on Table 3 to Table 4 is set to 3, HARQ timing of FIG. 10 can be acquired. As illustrated, an uplink subframe (indicated by 0') corresponding to a downlink subframe having a subframe index 0 (indicated by 0) is an uplink subframe having a subframe index 0. Further, an uplink subframe (indicated by 1') corresponding to a downlink subframe having a subframe index 1 (indicated by 1) is an uplink subframe having a subframe index 0. Furthermore, an uplink subframe (indicated by 2') corresponding to a downlink subframe having a subframe index 2 (indicated by 2) is an uplink subframe having a subframe index 1, and an uplink subframe (indicated by 3') corresponding to a downlink subframe having a subframe index 3 (indicated by 3) is an uplink subframe having a subframe index 2. Furthermore, an uplink subframe (indicated by 4') corresponding to a downlink subframe having a subframe index 4 (indicated by 4) is an uplink subframe having a subframe index 2 in an (i+1)-th frame.

In other words, in FIG. 10, in a case where an HARQ scheme is applied to a TDD frame, if an HARQ subframe is transmitted through a downlink subframe indicated by 0, a corresponding HARQ feedback can be transmitted through an uplink subframe indicated by 0'. In addition, in case of applying a DL HARQ scheme, an HARQ subpacket can be transmitted through an uplink subframe indicated by 0' when an A-MAP IE is transmitted through the downlink subframe indicated by 0.

In the example of FIG. 10, a downlink subframe having a subframe index 0 and a downlink subframe having a subframe index 1 can be included in one zone (i.e., access zone or relay zone). This is because a feedback for the downlink subframe having the subframe index 0 and the downlink subframe having the subframe index 1 is transmitted through the same uplink subframe (i.e., an uplink subframe having a subframe index 0). In addition, a downlink subframe having a subframe index 3 and a downlink subframe having a subframe index 4 can be included in one zone (i.e., access zone or relay zone). This is because a feedback for the downlink subframe having the subframe index 3 and the downlink subframe having the subframe index 4 is transmitted through the same uplink subframe (i.e., an uplink subframe having a subframe index 2).

In other words, $0^{th}$ and $1^{st}$ downlink subframes and a $0^{th}$ uplink subframe are preferably assigned to the same zone (e.g., access zone), and $3^{rd}$ and $4^{th}$ downlink subframes and a $2^{nd}$ uplink subframe are preferably assigned to the same zone (e.g., relay zone). A TDD frame can be configured by Table 5 below according to the aforementioned description.

TABLE 5

| Subframe index | 0 (DL) | 1 (DL) | 2 (DL) | 3 (DL) | 4 (DL) | 0 (UL) | 1 (UL) | 2 (UL) |
|---|---|---|---|---|---|---|---|---|
| Example 1 | Access | Access | Access | Relay | Relay | Access | Access | Relay |
| Example 2 | Access | Access | Relay | Relay | Relay | Access | Relay | Relay |

In other words, the aforementioned descriptions can be expressed by Table 6 below.

TABLE 6

| | AAI DL Access Zone: AAI DL Relay Zone: | AAI UL Access Zone: AAI UL Relay Zone: |
|---|---|---|
| Example 1 | 3:2 | 2:1 |
| Example 2 | 2:3 | 1:2 |

The aforementioned description is also applied to a case where a downlink to uplink ratio is determined to 6:2. Hereinafter, the case where the downlink to uplink ratio is determined to 6:2 will be described.

Figure 11:
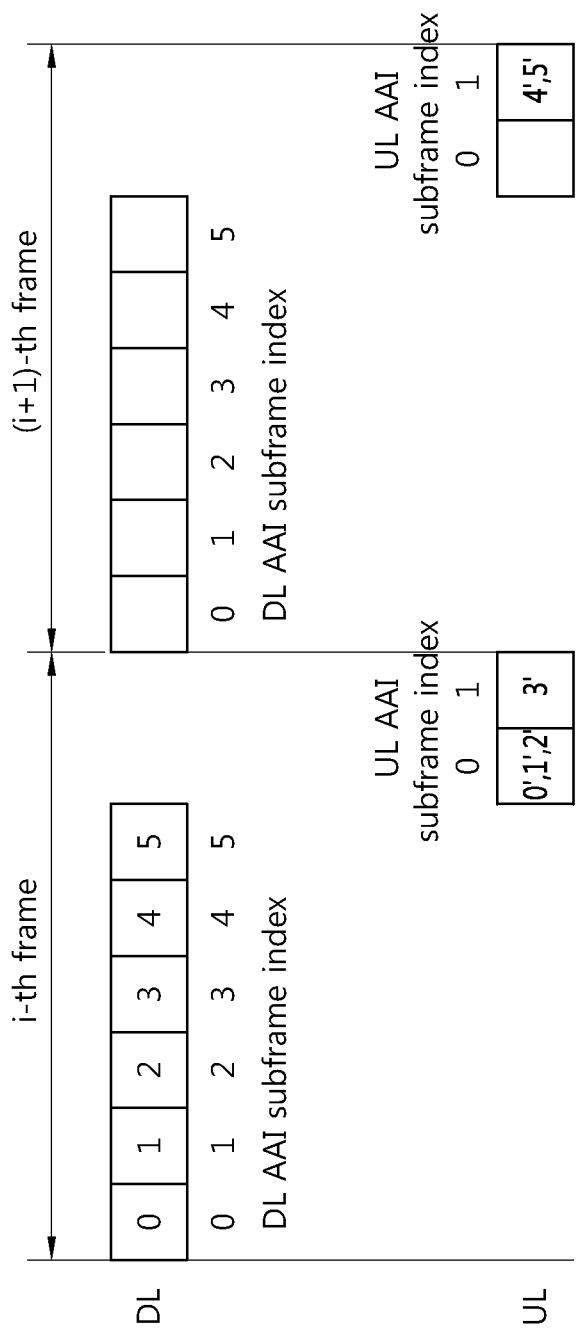
FIG. 11 is an example in which a ratio of subframes assigned to a downlink and an uplink is determined to 6:2.

FIG. 11 is an example in which a ratio of subframes assigned to a downlink and an uplink is determined to 6:2. As illustrated, an uplink subframe (indicated by 0') corresponding to a downlink subframe having a subframe index 0 (indicated by 0) is an uplink subframe having a subframe index 0. Further, an uplink subframe (indicated by 1') corresponding to a downlink subframe having a subframe index 1 (indicated by 1) and an uplink subframe (indicated by 2') corresponding to a downlink subframe having a subframe index 2 (indicated by 2) are uplink subframes having a subframe index 0. In addition, an uplink subframe (indicated by 3') corresponding to a downlink subframe having a subframe index 3 (indicated by 3) is an uplink subframe having a subframe index 1. Furthermore, an uplink subframe (indicated by 4') corresponding to a downlink subframe having a subframe index 4 (indicated by 4) and an uplink subframe (indicated by 5') corresponding to a downlink subframe having a subframe index 5 (indicated by 5) are determined to an uplink subframe having a subframe index 1 in an (i+1)-th frame.

In the example of FIG. 11, all of the downlink subframe having the subframe index 0, the downlink subframe having the subframe index 1, and the downlink subframe having the subframe index 2 can be included in one zone (i.e., access zone or relay zone). This is because a feedback for the aforementioned three downlink subframes is transmitted through the same uplink subframe (i.e., the uplink subframe having the subframe index 0). In addition, all of a downlink subframe having a subframe index 3, a downlink subframe having a subframe index 4, and a downlink subframe having a subframe index 5 can be included in one zone (i.e., access zone or relay zone). This is because a feedback for the aforementioned three downlink subframes is transmitted through the same uplink subframe (i.e., the uplink subframe having the subframe index 1). If the aforementioned condition is satisfied, it can be expressed by Table 7 below.

The aforementioned description can be expressed by Table 8 below.

TABLE 8

| | AAI DL Access Zone: AAI DL Relay Zone: | AAI UL Access Zone: AAI UL Relay Zone: |
|---|---|---|
| Example 3 | 3:3 | 1:1 |

The aforementioned description is also applied to a case where one frame includes a various number of subframes. Hereinafter, a case where a frame includes 7 subframes, and a downlink to uplink ratio is determined to 5:2 will be described for example.

Figure 12:
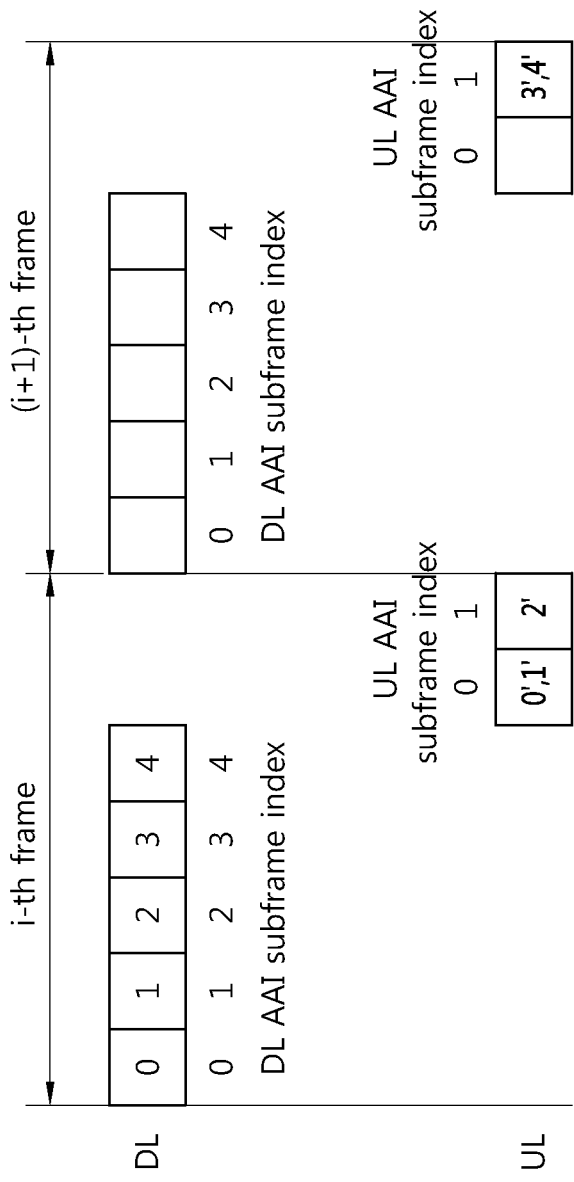
FIG. 12 shows an example in which a ratio of subframes assigned to a downlink and an uplink is determined to 5:2.

FIG. 12 shows an example in which a ratio of subframes assigned to a downlink and an uplink is determined to 5:2. As illustrated, an uplink subframe (indicated by 0') corresponding to a downlink subframe having a subframe index 0 (indicated by 0) is an uplink subframe having a subframe index 0. Further, an uplink subframe (indicated by 1') corresponding to a downlink subframe having a subframe index 1 (indicated by 1) is an uplink subframe having a subframe index 0. Furthermore, an uplink subframe (indicated by 2') corresponding to a downlink subframe having a subframe index 2 (indicated by 2) is an uplink subframe having a subframe index 1. Furthermore, an uplink subframe (indicated by 3') corresponding to a downlink subframe having a subframe index 3 (indicated by 3) and an uplink subframe (indicated by 4') corresponding to a downlink subframe having a subframe index 4 (indicated by 4) are determined to uplink subframes having a subframe index 1 in an (i+1)-th frame.

In the example of FIG. 12, all of the downlink subframe having the subframe index 0 and the downlink subframe having the subframe index 1 can be included in one zone (i.e., access zone or relay zone). This is because a feedback for the aforementioned two downlink subframes is transmitted through the same uplink subframe (i.e., the uplink subframe having the subframe index 0). In addition, all of a downlink subframe having a subframe index 2, a downlink subframe having a subframe index 3, and a downlink subframe having a subframe index 4 can be included in one zone (i.e., access zone or relay zone). This is because a feedback for the aforementioned three downlink subframes is transmitted through the same uplink subframe (i.e., the uplink subframe having the subframe index 1). If the aforementioned condition is satisfied, it can be expressed by Table 9 below.

TABLE 7

| Subframe index | 0 (DL) | 1 (DL) | 2 (DL) | 3 (DL) | 4 (DL) | 5 (UL) | 0 (UL) | 1 (UL) |
|---|---|---|---|---|---|---|---|---|
| Example 3 | Access | Access | Access | Relay | Relay | Relay | Access | Relay |

TABLE 9

| Subframe index | 0 (DL) | 1 (DL) | 2 (DL) | 3 (DL) | 4 (DL) | 0 (UL) | 1 (UL) |
|---|---|---|---|---|---|---|---|
| Example 4 | Access | Access | Relay | Relay | Relay | Access | Relay |

In other words, the aforementioned description can be expressed by Table 10 below.

TABLE 10

|  | AAI DL Access Zone:<br>AAI DL Relay Zone: | AAI UL Access Zone:<br>AAI UL Relay Zone: |
|---|---|---|
| Example 4 | 2:3 | 1:1 |

The aforementioned description is also applied to a case where a downlink to uplink ratio is determined to 4:3. Hereinafter, a case where a downlink to uplink ratio is determined to 4:3 will be described.

Figure 13:
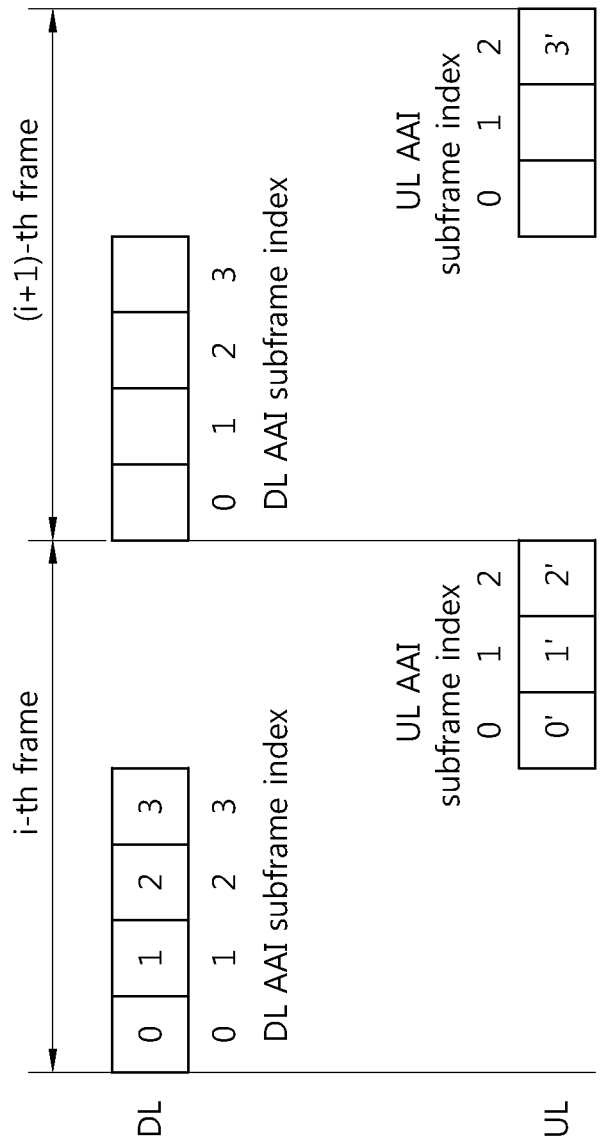
FIG. 13 is an example in which a ratio of subframes assigned to a downlink and an uplink is determined to 4:3.

FIG. 13 is an example in which a ratio of subframes assigned to a downlink and an uplink is determined to 4:3. As illustrated, an uplink subframe (indicated by 0') corresponding to a downlink subframe having a subframe index 0 (indicated by 0) is an uplink subframe having a subframe index 0.

Further, an uplink subframe (indicated by 1') corresponding to a downlink subframe having a subframe index 1 (indicated by 1) is an uplink subframe having a subframe index 1. Furthermore, an uplink subframe (indicated by 2') corresponding to a downlink subframe having a subframe index 2 (indicated by 2) is an uplink subframe having a subframe index 2. Furthermore, an uplink subframe (indicated by 3') corresponding to a downlink subframe having a subframe index 3 (indicated by 3) is determined to an uplink subframe having a subframe index 2 in an (i+1)-th frame.

In the example of FIG. 13, all of the downlink subframe having the subframe index 2 and the downlink subframe having the subframe index 3 can be included in one zone (i.e., access zone or relay zone). This is because a feedback for the aforementioned two downlink subframes is transmitted through the same uplink subframe (i.e., the uplink subframe having the subframe index 2). If the aforementioned condition is satisfied, it can be expressed by Table 11 below.

TABLE 11

| Subframe index | 0 (DL) | 1 (DL) | 2 (DL) | 3 (DL) | 0 (UL) | 1 (UL) | 2 (UL) |
|---|---|---|---|---|---|---|---|
| Example 5 | Access | Access | Relay | Relay | Access | Access | Relay |
| Example 6 | Access | Relay | Relay | Relay | Access | Relay | Relay |

The aforementioned description can be expressed by Table 12 below

TABLE 12

|  | AAI DL Access Zone:<br>AAI DL Relay Zone: | AAI UL Access Zone:<br>AAI UL Relay Zone: |
|---|---|---|
| Example 5 | 2:2 | 2:1 |
| Example 6 | 1:3 | 1:2 |

As described above, if the TDD frame consists of the downlink access zone, the downlink relay zone, the uplink access zone, and the uplink relay zone, then the access zone and the relay zone can be distinguished by considering HARQ timing. An example of the aforementioned TDD frame can be summarized by Table 13 below.

TABLE 13

|  | AAI DL Access Zone:<br>AAI DL Relay Zone: | AAI UL Access Zone:<br>AAI UL Relay Zone: |
|---|---|---|
| Example 1 | 3:2 | 2:1 |
| Example 2 | 2:3 | 1:2 |
| Example 3 | 3:3 | 1:1 |
| Example 4 | 2:3 | 1:1 |
| Example 5 | 2:2 | 2:1 |
| Example 6 | 1:3 | 1:2 |

It is possible to use all or some of the TDD frames of Table 13. That is, the TDD frame can consist of only some of the examples of FIG. 13.

Second Embodiment

In the first embodiment, an example of applying an HARQ scheme is explained when using an FDD frame. More specifically, unlike the conventional HARQ scheme not considering the access zone/relay zone, the second embodiment proposes an example of determining HARQ timing on the basis of the number of subframes included in the access zone and the number of subframes included in the relay zone.

First, when downlink HARQ timing is determined for the FDD frame, timing can be determined according to Table 14 below.

TABLE 14

| Content | AAI subframe Index in Access zone/Relay zone | Frame Index |
|---|---|---|
| Basic Assignment A-MAP IE Tx in DL | l | i |
| HARQ Subpacket Tx in DL | m = l | i |
| HARQ feedback in UL | n = ceil(m + F'/2)mod U | $j = \left(i + \text{floor}\left(\frac{\text{ceil}(m + F'/2)}{U}\right) + z\right) \bmod 4$ |

In Table 14, "Basic Assignment A-MAP IE Tx in DL" denotes timing for transmitting "A-MAP IE" including information regarding allocation of a radio resource in a downlink, "HARQ Subpacket Tx in DL" denotes timing for transmitting an HARQ subpacket transmitted in a downlink, and "HARQ feedback in UL" denotes timing for transmitting an ACK/NACK feedback for the HARQ subpacket in an uplink. In Table 14, floor( ) and ceil( ) denote a floor function and a ceil function, and mod denotes a modulo operation.

In Table 14, l and m are variables for indicating a subframe index. More specifically, l and m denote subframe indices in the access zone or the relay zone. That is, if the HARQ timing is determined in the access zone, l and m denote subframe indices in the access zone. In addition, if the HARQ timing is determined in the relay zone, l and m denote subframe indices in the relay zone. In Table 14, i denotes a frame index.

F' used in Table 14 denotes the number of subframes (uplink or downlink) included in one FDD frame. U of Table 14 denotes the number of uplink subframes included in the access zone or the relay zone. More specifically, when HARQ timing is determined in the access zone, U denotes the number of uplink subframes included in the access zone, and when it is determined in the relay zone, denotes the number of uplink subframes included in the relay zone.

As described, since HARQ timing based on Table 14 is determined on the basis of the number of subframes included in the access zone and the relay zone, an HARQ scheme can properly operate even if the access zone and the relay zone are included in the frame. z used in Table 14 denotes a downlink HARQ feedback offset, and is defined by Equation 7 below.

$$z = \begin{cases} 0, & \text{if } ((\text{ceil}(F'/2 - N_{TTI}) \geq T_{proc}) \\ 1, & \text{else} \end{cases} \quad [\text{Equation 7}]$$

Figure 14:
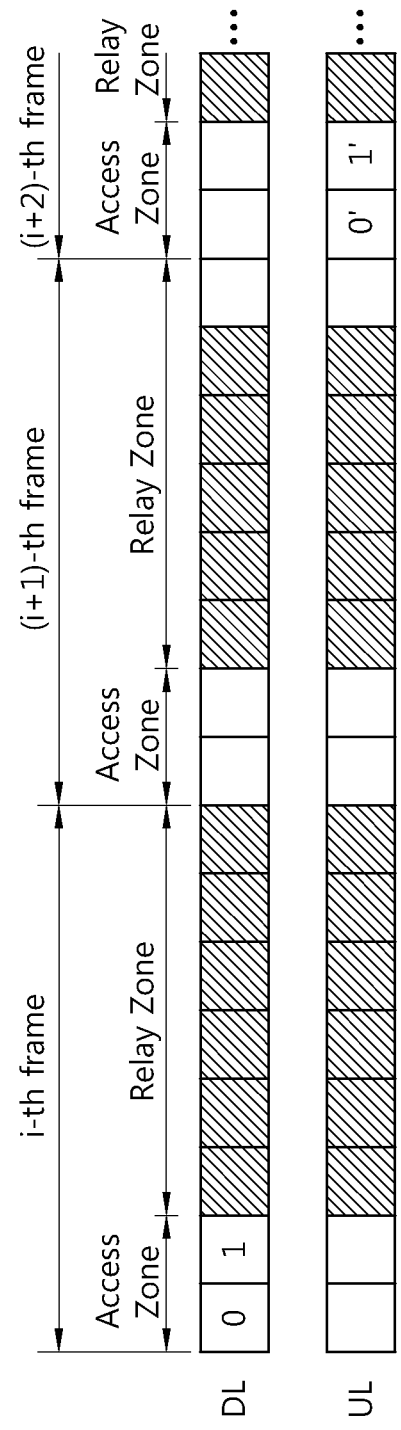
FIG. 14 shows an example of determining HARQ timing according to a second embodiment.

FIG. 14 shows an example of determining HARQ timing according to a second embodiment. In the example of FIG. 14, a processing time is set to 3. As illustrated, an uplink subframe (indicated by 0') corresponding to a downlink subframe having a subframe index 0 (indicated by 0) is determined to an uplink subframe having a subframe index 0 in an (i+2)-th frame.

Figure 15:
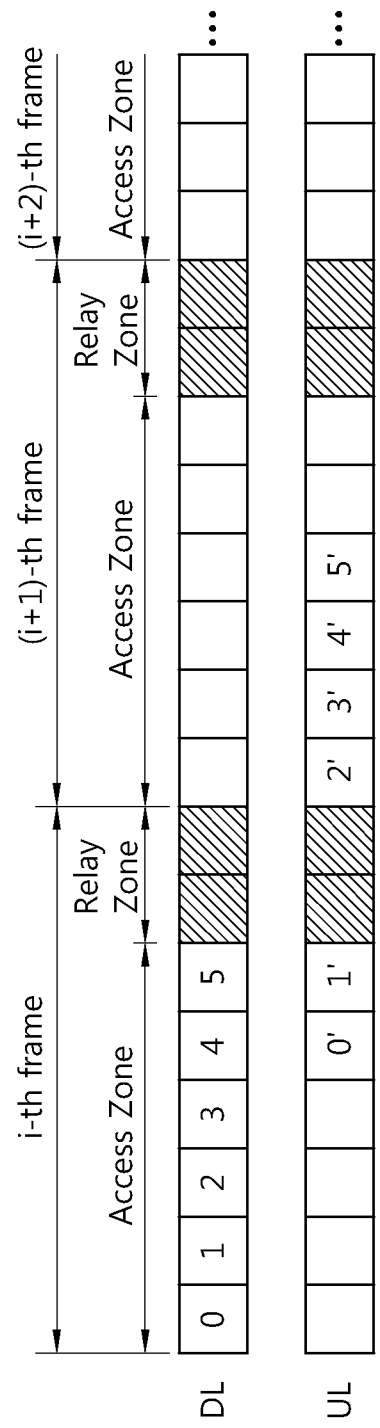
FIG. 15 shows another example of determining HARQ timing according to a second embodiment.

FIG. 15 shows another example of determining HARQ timing according to a second embodiment. In the example of FIG. 15, a processing time is set to 3. As illustrated, an uplink subframe (indicated by 0') corresponding to a downlink subframe having a subframe index 0 (indicated by 0) is determined to an uplink subframe having a subframe index 0.

Figure 16:
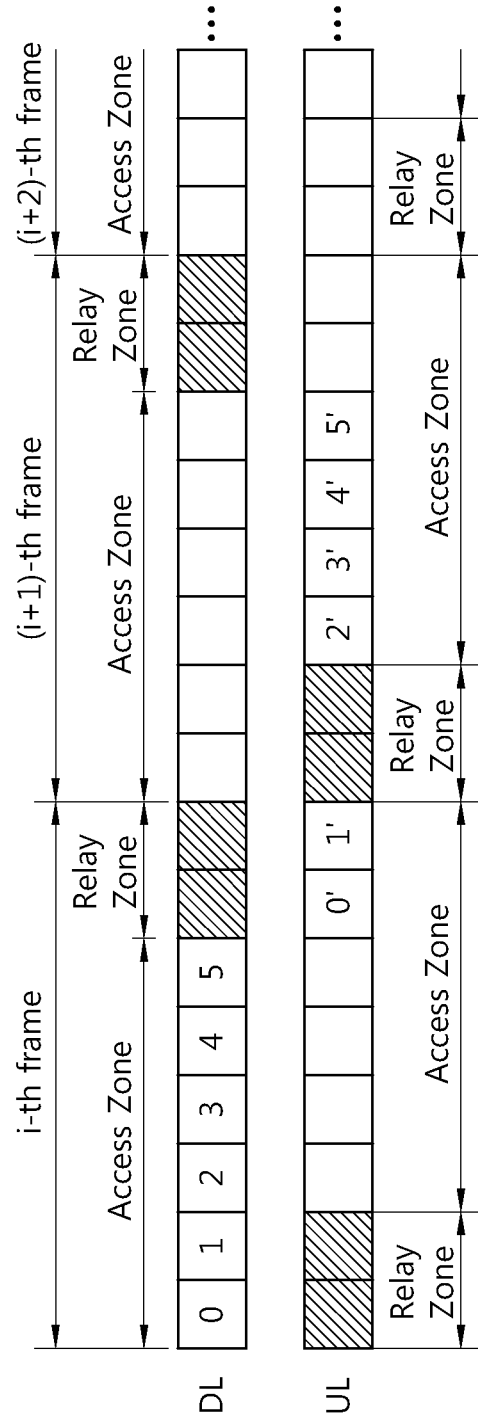
FIG. 16 shows another example of determining HARQ timing according to a second embodiment.

Although the access zone is first configured and then the relay zone is configured in the examples of FIG. 14 and FIG. 15, an order of the access zone and the relay zone may change. An example of a case where the order of the access zone and the relay zone changes in the uplink frame of FIG. 15 may be as shown in FIG. 16.

If uplink HARQ timing for the FDD frame is determined according to the second embodiment, it may follow Table 15 below.

TABLE 15

| Content | AAI subframe Index in Access zone/Relay zone | Frame Index |
|---|---|---|
| Basic Assignment A-MAP IE Tx in DL | l | i |
| HARQ Subpacket Tx in UL | m = n where n = ceil(m + F'/2)modU | $j = \left(i + \text{floor}\left(\frac{\text{ceil}(1 + F'/2)}{U}\right) + v\right) \bmod 4$ |
| HARQ feedback in DL | l | $k = \left(j + \text{floor}\left(\frac{\text{ceil}(m + F'/2)}{D}\right) + w\right) \bmod 4$ |
| H.ARQ Subpacket ReTx in UL | m | $p = \left(k + \text{floor}\left(\frac{\text{ceil}(1 + F'/2)}{U}\right) + v\right) \bmod 4$ |

In Table 15, "Basic Assignment A-MAP IE Tx in DL" denotes timing for transmitting "A-MAP IE" including information regarding allocation of a radio resource in a downlink, "HARQ Subpacket Tx in UL" denotes timing for transmitting an HARQ subpacket transmitted in an uplink, and "HARQ feedback in DL" denotes timing for transmitting an ACK/NACK feedback for the HARQ subpacket in a downlink. In addition, "HARQ Subpacket ReTx in UL" denotes timing for retransmitting a corresponding HARQ subpacket when a NACK feedback is transmitted. In Table 15, j, k, and p denote variables for expressing a frame index, v denotes a UL HARQ transmission offset, and w denotes a UL HARQ feedback offset. v and w are determined by Equations 8 and 9 below.

In addition, F' of Table 15 denotes the number of subframes (uplink or downlink) included in one FDD frame, U of Table 15 denotes the number of uplink subframes included in the access zone or the relay zone, and D of Table 15 denotes the number of downlink subframes included in the access zone or the relay zone. As described in Table 14, U and D denote the number of uplink subframes included in the access zone when HARQ timing of the access zone is determined, and denote the number of uplink subframes included in the relay zone when HARQ timing of the relay zone is determined.

As described above, since HARQ timing based on Table 15 is determined based on the number of subframes included in the access zone and the relay zone, an HARQ scheme can properly operate even if the frame includes the access zone and the relay zone.

$$v = \begin{cases} 0, & \text{if } ((\text{ceil}(F'/2 - 1) \geq T_{proc}) \\ 1, & \text{else} \end{cases} \quad \text{[Equation 8]}$$

$$w = \begin{cases} 0, & \text{if } ((\text{ceil}(F'/2 - N_{TTI}) \geq T_{proc}) \\ 1, & \text{else} \end{cases} \quad \text{[Equation 9]}$$

$N_{TTI}$ is set to 1 when transmitted by using a default TTI, and is set to the number of subframes across which a long TTI spans. For example, it may be set to 4 or U.

Third Embodiment

In the third embodiment, another example of applying an HARQ scheme is explained when using an FDD frame. More specifically, unlike the conventional HARQ scheme not considering the access zone/relay zone, the third embodiment proposes an example of determining HARQ timing on the basis of the number of subframes included in the access zone and the number of subframes included in the relay zone.

Figure 17:
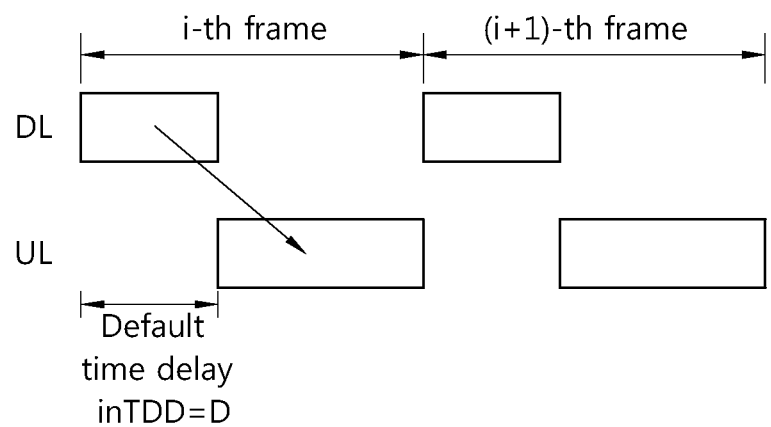
FIG. 17 shows a default time delay for calculating an HARQ feedback offset z.
Figure 18:
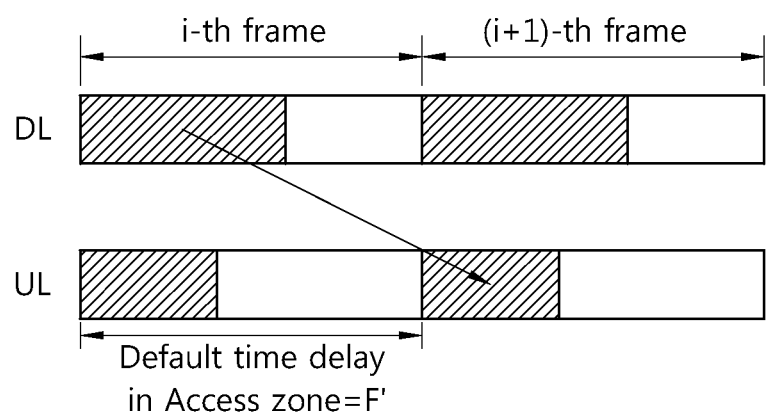
FIG. 18 shows a default time delay according to a third embodiment.
Figure 19:
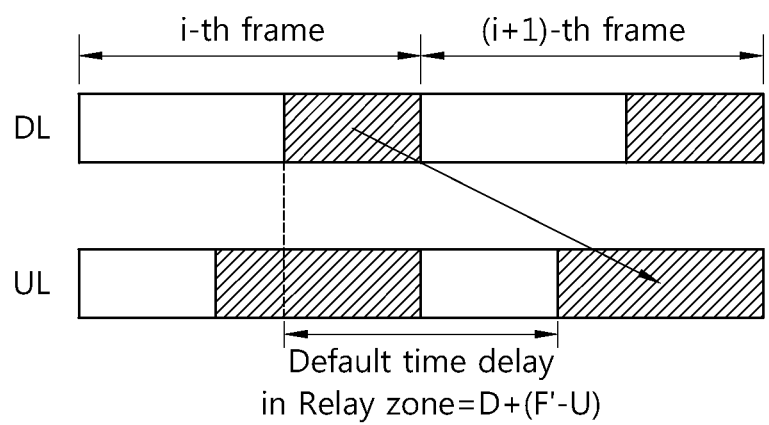
FIG. 19 shows another example of a default time delay according to a third embodiment.

The third embodiment proposes a method of applying HARQ timing applied to a TDD frame according to Table 3 and Table 4 to an FDD frame. When HARQ timing is determined according to the aforementioned Table 3 and Table 4, a default time delay for calculating an HARQ feedback offset z is determined according to the number D of subframes assigned for a downlink as shown in FIG. 17. However, if the default time delay is determined for an FDD frame including an access zone and a relay zone, the default time delay of the access zone can be determined to F' (i.e., the number of downlink and uplink subframes included in the FDD frame) as shown in FIG. 18. In addition, the default time delay of the relay zone can be determined to D+(F'−U) as shown in FIG. 19. D and U respectively denote the number of downlink subframes and the number of uplink subframes included in the relay zone. When the default time delay based on FIG. 18 and FIG. 19 is applied to Table 3 and Table 4 above, HARQ timing applicable to the FDD frame can be determined.

TABLE 16

| Content | AAI subframe Index in Access zone/Relay zone | Frame Index |
|---|---|---|
| Basic Assignment A-MAP IE Tx in DL | l | i |
| HARQ Subpacket Tx in DL | m = l | i |
| HARQ feedback in UL | For D > U, $n = \begin{cases} 0, \text{ for } 0 \leq m < K \\ m - K, \text{ for } K \leq m < U + K \\ U - 1, \text{ for } U + K \leq m < D \end{cases}$ For D ≤ U, n = m − K | j = (i + z + 1) mod 4 |

In Table 16, "Basic Assignment A-MAP IE Tx in DL" denotes timing for transmitting "A-MAP IE" including information regarding allocation of a radio resource in a downlink, "HARQ Subpacket Tx in DL" denotes timing for transmitting an HARQ subpacket transmitted in a downlink, and "HARQ feedback in UL" denotes timing for transmitting an ACK/NACK feedback for the HARQ subpacket in an uplink. In addition, l and m denote variables for indicating a subframe index in the access zone or the relay zone, and i denotes a variable for indicating a frame index.

Meanwhile, F' of table 16 denotes the number of subframes (uplink or downlink) included in one FDD frame, U of Table 16 denotes the number of uplink subframes included in the access zone or the relay zone, and D of Table 16 denotes the number of downlink subframes included in the access zone or the relay zone. As described above, since HARQ timing based on Table 16 is determined based on the number of subframes included in the access zone and the relay zone, an HARQ scheme can properly operate even if the frame includes the access zone and the relay zone. z used in Table 16 denotes a downlink HARQ feedback offset, and is defined by Equation 10 below.

$$z = \begin{cases} 0, & \text{if } ((L - m - N_{TTI} + n) \geq T_{proc}) \\ 1, & \text{else} \end{cases} \quad \text{[Equation 10]}$$

In Equation 10, L denotes a default time delay for defining an HARQ feedback offset. The default time delay is determined as shown in FIG. 18 and FIG. 19. In addition, it is determined by Equation 11 below.

$$L = \begin{cases} F' & \text{in Access Zone} \\ F' + D - U & \text{in Relay zone} \end{cases} \quad \text{[Equation 11]}$$

Figure 20:
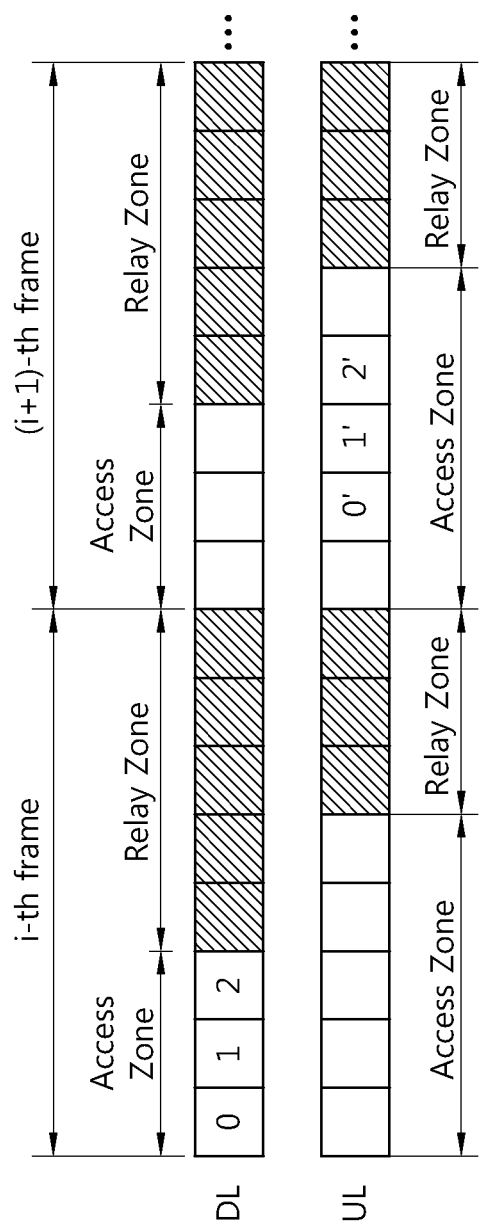
FIG. 20 shows an example of determining HARQ timing according to a third embodiment.

FIG. 20 shows an example of determining HARQ timing according to a third embodiment. In the example of FIG. 20, a processing time is set to 3. As illustrated, an uplink subframe (indicated by 0') corresponding to a downlink subframe having a subframe index 0 (indicated by 0) is determined to an uplink subframe having a subframe index 0 in an (i+1)-th frame. Although the access zone is first configured and then the relay zone is configured in the example of FIG. 20, an order of the access zone and the relay zone may change. That is, in a downlink frame (or uplink frame), the relay zone may be first configured and then the access zone may be configured later.

Figure 21:
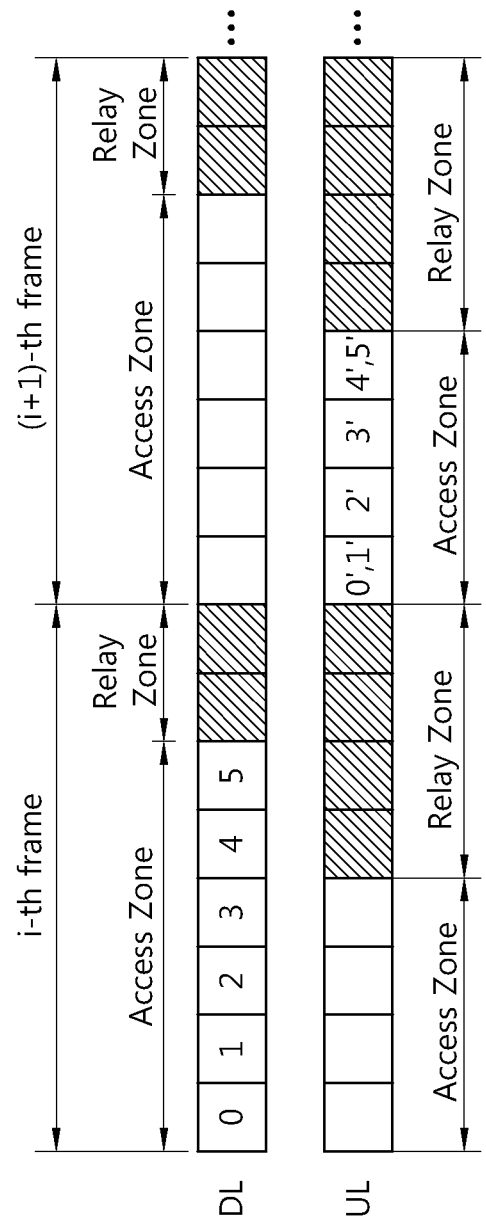
FIG. 21 shows another example of determining HARQ timing according to a third embodiment.

FIG. 20 shows another example of determining HARQ timing according to a third embodiment. In the example of FIG. 21, a processing time is set to 3. As illustrated, an uplink subframe (indicated by 0') corresponding to a downlink subframe having a subframe index 0 (indicated by 0) is determined to an uplink subframe having a subframe index 0 in an (i+1)-th frame. Although the access zone is first configured and then the relay zone is configured in the example of FIG. 21, an order of the access zone and the relay zone may change.

If uplink HARQ timing for the FDD frame is determined according to the third embodiment, it may follow Table 17 below.

$$L = \begin{cases} F' & \text{in Access Zone} \\ F' + D - U & \text{in Relay zone} \end{cases} \quad \text{[Equation 14]}$$

Meanwhile, in Equation 13, M denotes a default time delay for defining an uplink HARQ feedback offset. M can be determined by Equation 15 below.

$$M = \begin{cases} F' & \text{in Access Zone} \\ F' + D - U & \text{in Relay zone} \end{cases} \quad \text{[Equation 15]}$$

F' used in Equations 14 and 15 denotes the number of subframes (uplink or downlink) included in one FDD frame, U of Table 17 denotes the number of uplink subframes included in the access zone or the relay zone, and D of Table 17 denotes the number of downlink subframes included in the

TABLE 17

| Content | AAI sub Index in Access zone/Relay zone | Frame Index |
|---|---|---|
| Basic Assignment A-MAP TB Tx in DL | l | i |
| HARQ Subpacket Tx in UL | For $D \geq U$, $m = \begin{cases} 0, \text{ for } 0 \leq l < K \\ l - K, \text{ for } K \leq l < U + K \\ U - 1, \text{ for } U + K \leq l < D \end{cases}$ For $1 < D < U$, $m = \begin{cases} 0, \ldots, \text{ or } l - K, \text{ for } l = 0 \\ l - K, \text{ for } 0 < l < D - 1 \\ l - K, \ldots, \text{ or } U - 1, \text{ for } l = D - 1 \end{cases}$ For $D = 1, m = 0, \ldots,$ or $U - 1$ for $l = 0$ | $j = (i + v + 1) \bmod 4$ |
| HARQ feedback in DL | l | $k = (j + 1 + w) \bmod 4$ |
| HARQ Subpacket ReTx in UL | m | $p = (k + v + 1) \bmod 4$ |

In Table 17, "Basic Assignment A-MAP IE Tx in DL" denotes timing for transmitting "A-MAP IE" including information regarding allocation of a radio resource in a downlink, "HARQ Subpacket Tx in UL" denotes timing for transmitting an HARQ subpacket transmitted in an uplink, and "HARQ feedback in DL" denotes timing for transmitting an ACK/NACK feedback for the HARQ subpacket in a downlink. In addition, "HARQ Subpacket ReTx in UL" denotes timing for retransmitting a corresponding HARQ subpacket when a NACK feedback is transmitted. In Table 17, j, k, and p denote variables for expressing a frame index, v denotes a UL HARQ transmission offset, and w denotes a UL HARQ feedback offset. v and w are determined by Equations 12 and 13 below.

$$v = \begin{cases} 0, & \text{if}((L - l - 1 + m) \geq T_{proc}) \\ 1, & \text{else} \end{cases} \quad \text{[Equation 12]}$$

$$w = \begin{cases} 0, & \text{if}((M - m - N_{TTI} + l) \geq T_{proc}) \\ 1, & \text{else} \end{cases} \quad \text{[Equation 13]}$$

In Equation 12, L denotes a default time delay for defining an uplink HARQ transmission offset. L can be determined by Equation 14 below.

access zone or the relay zone. As described above, since HARQ timing based on Table 17 is determined based on the number of subframes included in the access zone and the relay zone, an HARQ scheme can properly operate even if the frame includes the access zone and the relay zone.

Fourth Embodiment

In order to determine HARQ timing in a frame including an access zone and a relay zone, the fourth embodiment proposes a method of configuring a frame by multiplexing a subframe for a first system and a subframe for a second system in one frame. A frame configured according to the fourth embodiment may be a TDD frame. The first system may be an IEEE 802.16e system for performing communication in an OFDMA symbol unit instead of a subframe unit. The second system may be an IEEE 802.16m system for performing communication in a subframe unit including a plurality of OFDMA symbols. The communication system to which the fourth embodiment is applied may be a system conforming to a legacy support mode which supports not only an MS belonging to an IEEE 802.16m system (hereinafter, "16m MS") but also an MS belonging to an IEEE 802.16e system (hereinafter, "16e MS"). Hereinafter, for convenience of explanation, the IEEE 802.16m system can be called an advanced air interface (AAI) system, and the IEEE 802.16e system can be called a WirelessMAN-OFDMA system or a legacy system.

Figure 22:
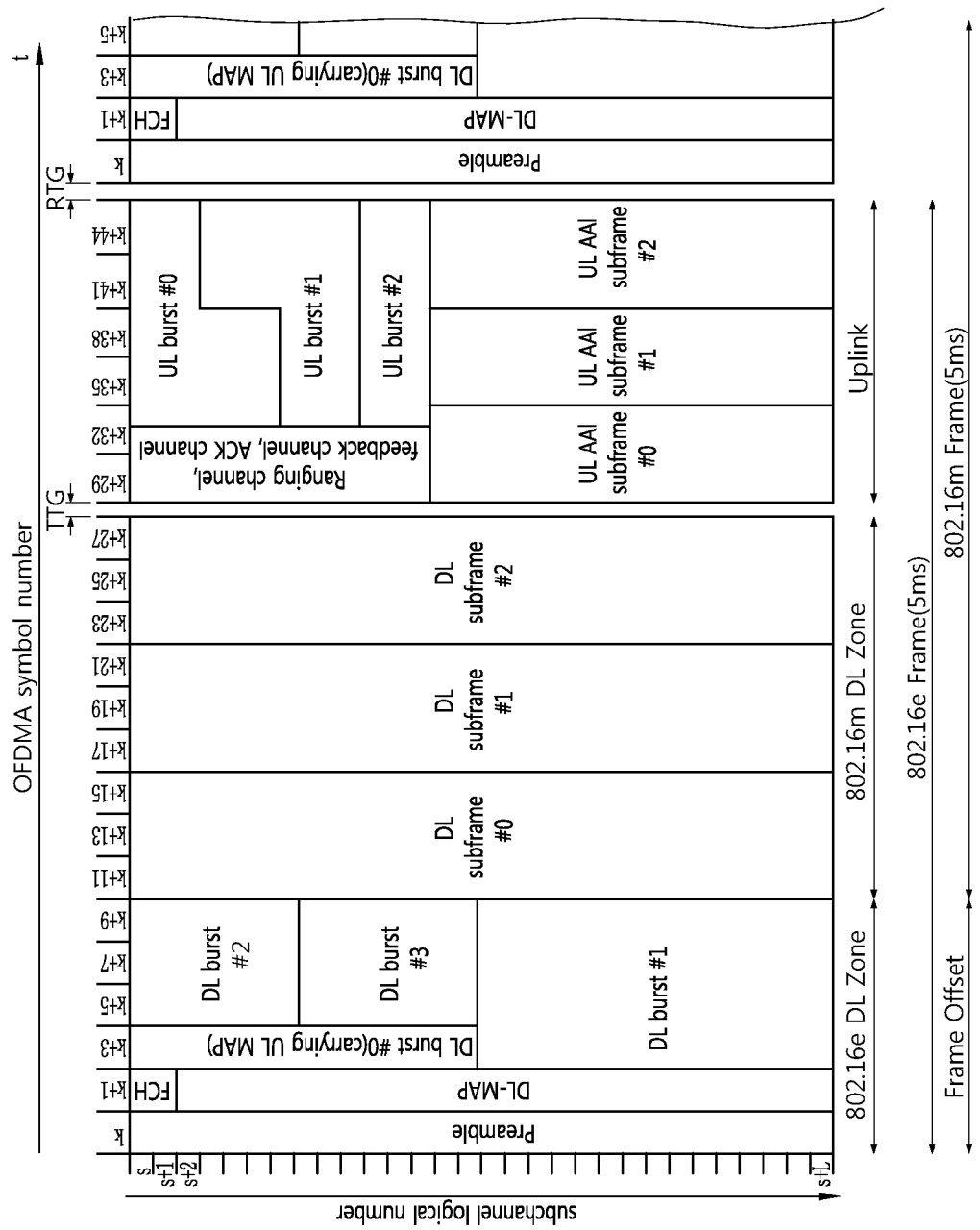
FIG. 22 shows an example of a frame structure for supporting a mobile station belonging to two different systems.

FIG. 22 shows an example of a frame structure for supporting an MS belonging to two different systems. More specifically, the frame structure of FIG. 22 shows a TDD frame structure in a case where a UL partially used sub-carrier (PUSC) permutation is supported in a legacy support mode, and a legacy region and an AAI region are multiplexed in an uplink in a frequency division multiplexing (FDM) manner.

Referring to FIG. 22, a frame includes a downlink (DL) subframe and an uplink (UL) subframe. The DL subframe temporally precedes the UL subframe. The DL subframe sequentially includes a preamble, a frame control header (FCH), a DL-MAP, a UL-MAP, and a burst region. The UL subframe includes a UL control channel such as a ranging channel, a feedback channel, etc., and a burst region. A guard time for identifying the DL subframe and the UL subframe is inserted to a middle portion (between the DL subframe and the UL subframe) and a last portion (next to the UL subframe) of the frame. A transmit/receive transition gap (TTG) is a gap between a DL burst and a subsequent UL burst. A receive/transmit transition gap (RTG) is a gap between a UL burst and a subsequent DL burst. The DL zone and the UL zone are divided into a region for a 16e MS and a region for a 16m MS. In the DL zone, a preamble, an FCH, a DL-MAP, a UL-MAP, and a DL burst region are the region for the 16e MS, and the remaining regions are the region for the 16m MS. In the UL zone, a UL control channel and a UL burst region are the region for the 16e MS, and the remaining regions are the region for the 16m MS. In the UL zone, the region for the 16e MS and the region for the 16m MS can be multiplexed in various manners. Although the UL zone is multiplexed in an FDM manner in FIG. 22, the present invention is not limited thereto, and thus the UL zone can also be multiplexed in a TDM manner.

If a legacy region and an AAI region are multiplexed in an FDM manner in an uplink, a subcarrier group including a plurality of subcarriers, that is, a subchannel, is assigned to the legacy region. Another subchannel including the remaining plurality of subcarriers constitutes a UL subframe and is assigned to the AAI region. If a bandwidth is any one of 5, 7, 10, and 20 MHz, all UL subframes are type-1 subframes. That is, 6 OFDMA symbols are included. If the bandwidth is 8.75 MHz, a first UL subframe is a type-1 subframe, and the remaining subframes are type-4 subframes. A control channel and burst for MSs can be scheduled in a subchannel in the legacy region or a subchannel in the AAI region according to a mode in which an MS is connected to a BS. However, the subchannel in the legacy region and the subchannel in the AAI region are not scheduled in the same frame. Meanwhile, although the legacy region and the AAI region are multiplexed in an FDM manner in FIG. 22, they are multiplexed in the FDM manner on a logical subchannel index. On a physical subchannel index, the legacy region and the AAI region may co-exist in a frequency domain.

A preamble is used between a BS and an MS for initial synchronization, cell search, frequency offset, and channel estimation. The FCH includes information on a length of a DL-MAP message and a coding scheme of the DL-MAP. The DL-MAP is a region for transmitting the DL-MAP message. The DL-MAP message defines access to a DL channel. This implies that the DL-MAP message defines DL channel indication and/or control information. The DL-MAP message includes a configuration change count of a downlink channel descriptor (DCD) and a BS identifier (ID). The DCD describes a DL burst profile applied to a current MAP. The DL burst profile indicates characteristics of a DL physical channel. The DCD is periodically transmitted by the BS by using a DCD message. The UL-MAP is a region for transmitting a UL-MAP message. The UL-MAP message defines access to a UL channel. This implies that the UL-MAP message defines UL channel indication and/or control information. The UL-MAP message includes a configuration change count of an uplink channel descriptor (UCD) and also includes an effective allocation start time of UL allocation defined by the UL-MAP. The UCD describes a UL burst profile. The UL burst profile indicates characteristics of a UL physical channel. The UCD is periodically transmitted by the BS by using a UCD message. The DL burst is a region for transmitting data sent by the BS to the MS. The UL burst is a region for transmitting data sent by the MS to the BS. The fast feedback region is included in a UL burst region of an OFDM frame. The fast feedback region is used to transmit information that requires a fast response from the BS. The fast feedback region can be used for CQI transmission. A location of the fast feedback region is determined by the UL-MAP. The location of the fast feedback region may be a fixed location in the OFDM frame, or may be a variable location.

Figure 23:
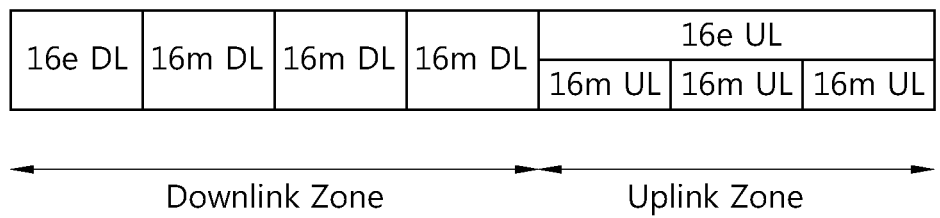
FIG. 23 shows a frame structure simplified from a frame structure of FIG. 22 on a subframe basis.

FIG. 23 shows a frame structure simplified from the frame structure of FIG. 22 on a subframe basis. As illustrated, a DL/UL zone for 802.16e and a DL/UL zone for 802.16m can be multiplexed in one frame.

Figure 24:
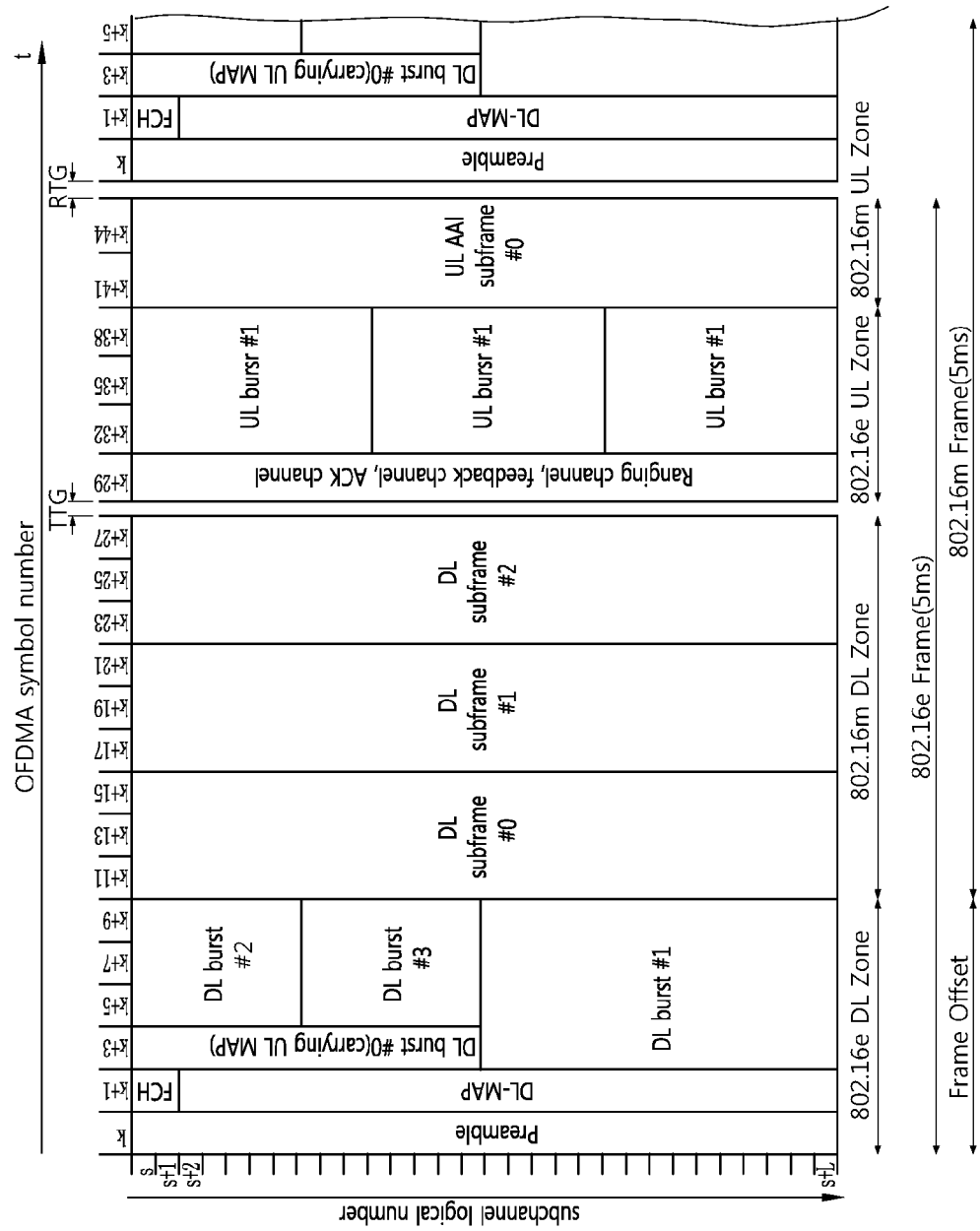
FIG. 24 shows an example in which an uplink zone of a frame of FIG. 23 is multiplexed in a TDM manner.
Figure 25:
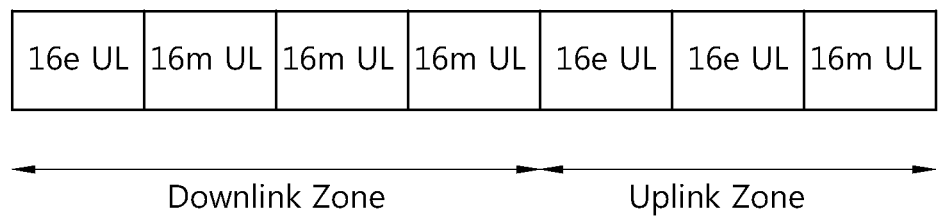

FIG. 24 shows an example in which the UL zone of the frame of FIG. 23 is multiplexed in a TDM manner. As illustrated, a UL zone of a frame supporting both a 16e MS and a 16m MS can be multiplexed in a TDM manner. The frame based on FIG. 24 can be simplified on a subframe basis as shown in FIG. 25.

Figure 26:
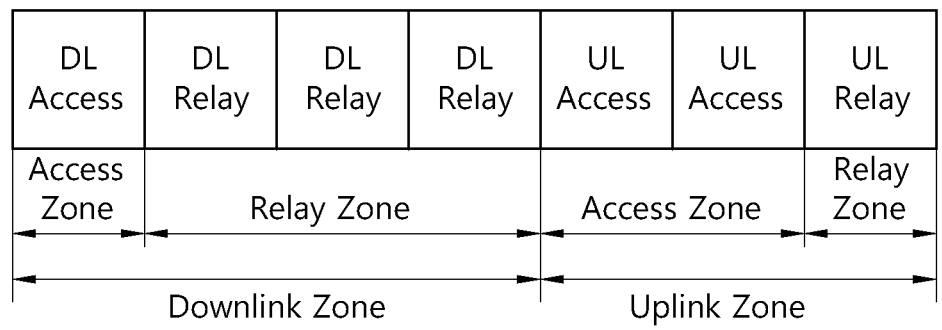
FIG. 26 shows an example of a TDD frame including an access zone and a relay zone according to a fourth embodiment.

FIG. 26 shows an example of a TDD frame including an access zone and a relay zone according to a fourth embodiment. More specifically, in the example of FIG. 26, a structure of an access zone and a relay zone included in one frame is determined based on the structure of FIG. 25. As illustrated, a subframe for a 16e MS may correspond to an access zone, and a subframe for a 16m MS may correspond to a relay zone. In addition, the subframe for the 16e MS may correspond to the relay zone, and the subframe for the 16m MS may correspond to the access zone.

When the access zone and the relay zone are identified according to the fourth embodiment, there is an advantage in that HARQ timing based on Table 3 and Table 4 is also applicable to the access zone and the relay zone. More specifically, a detailed method of determining HARQ timing according to Table 3 and Table 4 with respect to a frame supporting both the 16e MS and the 16m MS may refer to the section 16.2.14.2.2.3 of IEEE P802.16m/D3. The following is a brief description on the section 16.2.14.2.2.3 of IEEE P802.16m/D3.

Figure 27:
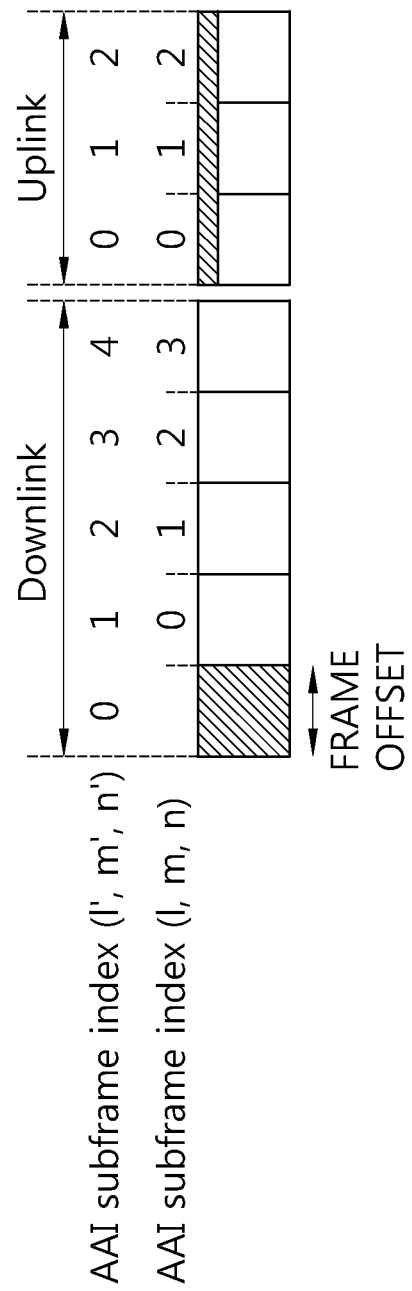
FIG. 27 shows an example of determining HARQ timing according to a fourth embodiment.

FIG. 27 shows an example of regulating a subframe index with respect to a frame supporting both a 16e MS and a 16m MS. As illustrated, a subframe index for the frame supporting both the 16e MS and the 16m MS is regulated according to a frame offset. Since FIG. 27 is an example in which an uplink is multiplexed in an FDM manner, if the uplink is multiplexed in a TDM manner, a frame offset must be considered also in the uplink. The following description is based on FIG. 27 for convenience of explanation.

A DL HARQ feedback offset z used in Table 3 and Equation 4 above, a UL HARQ transmission offset v used in Table 4 and Equation 5 above, and a UL HARQ feedback offset w used in Table 4 and Equation 6 above are determined by l', m', and n' which are subframe indices based on FIG. 27.

More specifically, in a TDD frame supporting both a 16e MS and a 16m MS, the DL HARQ feedback offset z can be determined by Equation 16 below instead of Equation 4.

$$z = \begin{cases} 0, & \text{if}((D' - m - N_{TTI} + n') \geq T_{DL\_Rx\_Processing}) \\ 1, & \text{else} \end{cases}$$ [Equation 16]

In addition, the UL HARQ transmission offset v can be determined by Equation 17 below instead of Equation 5.

$$v = \begin{cases} 0, & \text{if}((D' - l' - 1 + m') \geq T_{UL\_Tx\_Processing}) \\ 1, & \text{else} \end{cases}$$ [Equation 17]

In addition, the UL HARQ feedback offset w can be determined by Equation 18 below instead of Equation 6.

$$w = \begin{cases} 0, & \text{if}((U' - m - N_{TTI} + l') \geq T_{UL\_Rx\_Processing}) \\ 1, & \text{else} \end{cases}$$ [Equation 18]

The aforementioned first to fourth embodiments can be implemented in various communication devices.

Figure 28:
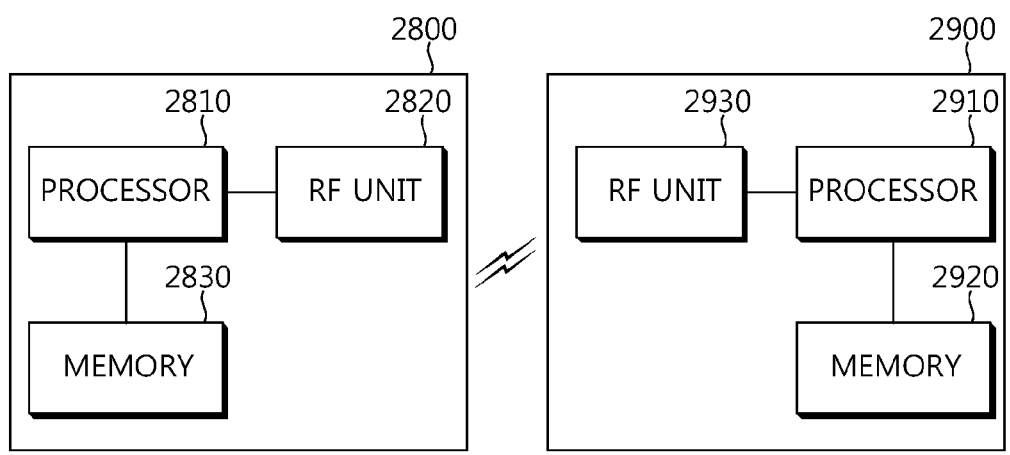
FIG. 28 shows a relay station and a mobile station/base station communicating with the relay station according to the aforementioned embodiment.

FIG. 28 shows an RS and an MS/BS communicating with the RS according to the aforementioned embodiment. An RS 2800 includes a processor 2810, a memory 2830, and a radio frequency (RF) unit 2820. The processor 2810 can assign a radio resource according to information externally provided and information pre-stored internally, etc. Among the aforementioned embodiments, the procedures, methods, and functions performed by the RS can be implemented by the processor 2810. The memory 2830 is coupled to the processor 2810, and stores a variety of information for driving the processor 2810. The RF unit 2820 is coupled to the processor 2810, and transmits and/or receives a radio signal.

The MS or BS communicating with the RS includes a processor 2910, a memory 2920, and an RF unit 2930. Among the aforementioned embodiments, the procedures, methods, and functions performed by the MS/BS can be implemented by the processor 2910. The memory 2920 is coupled to the processor 2910, and stores a variety of information for driving the processor 2910. The RF unit 2930 is coupled to the processor 2910, and transmits and/or receives a radio signal.

The processors 2810 and 2910 may include an application-specific integrated circuit (ASIC), a separate chipset, a logic circuit, and/or a data processing unit. The memories 2830 and 2920 may include a read-only memory (ROM), a random access memory (RAM), a flash memory, a memory card, a storage medium, and/or other equivalent storage devices. The RF units 2820 and 2930 may include a base-band circuit for processing a radio signal. When the embodiment of the present invention is implemented in software, the aforementioned methods can be implemented with a module (i.e., process, function, etc.) for performing the aforementioned functions. The module may be stored in the memories 2830 and 2920 and may be performed by the processors 2810 and 2910. The memories 2830 and 2920 may be located inside or outside the processors 2810 and 2910, and may be coupled to the processors 2810 and 2910 by using various well-known means.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method for communicating hybrid automatic retransmit request (HARQ) data with a mobile station and a base station by using a frame in a wireless communication system employing a relay station, the method performed by the relay station and comprising:

obtaining, by the relay station, basic assignment information for downlink on a first subframe of a time division duplexing (TDD) frame including a plurality of subframes, wherein each TDD frame is indexed by a frame index, and each of the plurality of subframes in the TDD frame is indexed by a subframe index, wherein the TDD frame includes at least one downlink subframe for an access zone followed by at least one downlink subframe for a relay zone followed by at least one uplink subframe for the access zone followed by at least one uplink subframe for the relay zone, and wherein the access zone is configured between the relay station and the mobile station, wherein the relay zone is configured between the relay station and the base station;

transmitting, by the relay station, a HARQ packet to the mobile station on the first subframe of the TDD frame; and receiving, by the relay station, a HARQ feedback for the HARQ packet from the mobile station, wherein, if a total number of downlink subframes included in the TDD frame is 5 and a total number of uplink subframes included in the TDD frame is 3, a ratio of the at least one downlink subframe for the access zone, the at least one downlink subframe for the relay zone, the at least one uplink subframe for the access zone, and the at least one uplink subframe for the relay zone in the TDD frame is set to 3:2:2:1 or 2:3:1:2, wherein a subframe index of a subframe carrying the HARQ feedback is defined by $$\text{for } D > U, \quad n = \begin{cases} 0, & \text{for } 0 \leq m < K \\ m - K, & \text{for } K \leq m < U + K \\ U - 1, & \text{for } U + K \leq m < D \end{cases}$$

$$\text{for } O \leq U, \quad n = m - K,$$

where n denotes the subframe index of the subframe carrying the HARQ feedback, D denotes the total number of downlink subframes included in the TDD frame, U denotes the total number of uplink subframes included in the TDD frame, m denotes the subframe index of the first subframe, and K denotes a temporary variable which is defined by $$K = \begin{cases} -\text{cell}\left(\frac{U-D}{2}\right), & \text{for } D \leq U \\ \text{floor}\left(\frac{D-U}{2}\right), & \text{for } D > U \end{cases}$$

wherein a frame index of a subframe carrying the HARQ feedback is defined by $j=(i+z) \bmod 4$ where j denotes the frame index of the subframe carrying the HARQ feedback, i denotes a frame index of a subframe carrying the HARQ packet, and z denotes a temporary variable which is defined by $$z = \begin{cases} 0, & \text{if } (D-m-N_{TTI}+n) \geq T_{DL,RX,processing} \\ 1, & \text{else} \end{cases}$$

where $N_{TTP}$ denotes a number of subframes across which the HARQ packet spans, and $T_{DL\_Rx\_Processing}$ denotes a downlink reception processing time.

2. The method of claim 1, further comprising:
Receiving, by the relay station, an additional HARQ packet from the base station on the second subframe of the TDD frame.

3. A relay station for communicating hybrid automatic retransmit request (HARQ) data with a mobile station and a base station by using a frame in a wireless communication system, the relay station comprising:
A radio frequency unit; and
A processor coupled to the radio frequency unit and configured to:
obtain basic assignment information for downlink on a first subframe of a time division duplexing (TDD) frame including a plurality of subframes,
wherein each TDD frame is indexed by a frame index, and each of the plurality of subframes in the TDD frame is indexed by a subframe index,
wherein the TDD frame includes at least one downlink subframe for an access zone followed by at least one downlink subframe for a relay zone followed by at least one uplink subframe for the access zone followed by at least one uplink subframe for the relay zone, and
wherein the access zone is configured between the relay station and the mobile station,
wherein the relay zone is configured between the relay station and the base station;
transmit a HARQ packet to the mobile station on the first subframe of the TDD frame; and
receive a HARQ feedback for the HARQ packet from the mobile station,
wherein, if a total number of downlink subframes included in the TDD frame is 5 and a total number of uplink subframes included in the TDD frame is 3, a ratio of the at least one downlink subframe for the access zone, the at least one downlink subframe for the relay zone, the at least one uplink subframe for the access zone, and the at least one uplink subframe for the relay zone in the TDD frame is set to 3:2:2:1 or 2:3:1:2,
wherein a subframe index of a subframe carrying the HARQ feedback is defined by $$\text{for } D > U, \quad n = \begin{cases} 0, & \text{for } 0 \leq m < K \\ m-K, & \text{for } K \leq m < U+K \\ U-1, & \text{for } U+K \leq m < D \end{cases}$$

$\text{for } O \leq U, \quad n = m - K,$ where n denotes the subframe index of the subframe carrying the HARQ feedback, D denotes the total number of downlink subframes included in the TDD frame, U denotes the total number of uplink subframes included in the TDD frame, m denotes the subframe index of the first subframe, and K denotes a temporary variable which is defined by $$K = \begin{cases} -\text{cell}\left(\frac{U-D}{2}\right), & \text{for } D \leq U \\ \text{floor}\left(\frac{D-U}{2}\right), & \text{for } D > U \end{cases}$$

wherein a frame index of a subframe carrying the HARQ feedback is defined by $j=(i+z) \bmod 4,$ where j denotes the frame index of the subframe carrying the HARQ feedback, i denotes a frame index of a subframe carrying the HARQ packet, and z denotes a temporary variable which is defined by $$z = \begin{cases} 0, & \text{if } (D-m-N_{TTI}+n) \geq T_{DL,RX,processing} \\ 1, & \text{else} \end{cases}$$

where $N_{TTP}$ denotes a number of subframes across which the HARQ packet spans, $T_{DL\_Rx\_Processing}$ denotes a downlink reception time.

4. The relay station of claim 3, further comprising:
Wherein the processor is further configured to receive an additional HARQ packet from the base station on the second subframe of the TDD frame.

* * * * *